(12) United States Patent
Flammer, III et al.

(10) Patent No.: US 8,279,870 B2
(45) Date of Patent: Oct. 2, 2012

(54) METHOD AND SYSTEM OF ROUTING IN A UTILITY SMART-GRID NETWORK

(75) Inventors: George Flammer, III, Cupertino, CA (US); Raj Vaswani, Portola Valley, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 425 days.

(21) Appl. No.: 11/888,634

(22) Filed: Aug. 1, 2007

(65) Prior Publication Data
US 2009/0034419 A1 Feb. 5, 2009

(51) Int. Cl.
H04L 12/28 (2006.01)
(52) U.S. Cl. .......................... 370/392; 370/235; 370/315
(58) Field of Classification Search .................. 370/235, 370/315, 392
See application file for complete search history.

(56) References Cited

U.S. PATENT DOCUMENTS

| | | | |
|---|---|---|---|
| 6,381,656 B1 | 4/2002 | Shankman | |
| 6,442,144 B1 | 8/2002 | Hansen et al. | |
| 6,980,973 B1 | 12/2005 | Karpenko | |
| 6,985,087 B2 * | 1/2006 | Soliman | 340/870.02 |
| 7,231,459 B2 * | 6/2007 | Saraph et al. | 709/241 |
| 7,310,052 B2 | 12/2007 | Bowman | |
| 7,406,032 B2 * | 7/2008 | Li et al. | 370/217 |
| 7,414,978 B2 | 8/2008 | Lun et al. | |
| 7,720,993 B2 | 5/2010 | Liu et al. | |
| 7,768,926 B2 | 8/2010 | Bellur et al. | |
| 2002/0013856 A1 * | 1/2002 | Garcia-Luna-Aceves et al. | 709/238 |
| 2003/0028651 A1 | 2/2003 | Schreckengast et al. | |
| 2003/0058798 A1 * | 3/2003 | Fleischer et al. | 370/238 |
| 2004/0103275 A1 | 5/2004 | Ji et al. | |
| 2004/0170125 A1 | 9/2004 | O'Neill | |
| 2005/0111375 A1 * | 5/2005 | Ravindran et al. | 370/252 |
| 2005/0135309 A1 | 6/2005 | Hester et al. | |
| 2005/0138200 A1 * | 6/2005 | Liu et al. | 709/238 |
| 2006/0059434 A1 | 3/2006 | Boss et al. | |
| 2006/0146716 A1 | 7/2006 | Lun et al. | |
| 2006/0171403 A1 | 8/2006 | Kim et al. | |

(Continued)

FOREIGN PATENT DOCUMENTS

WO WO 98/51118 A1 11/1998

(Continued)

OTHER PUBLICATIONS

International Search Report and Written Opinion, dated Oct. 17, 2008.
Kyungtae Woo et al., "Non-Blocking, Localized Routing Algorithm for Balanced Energy Consumption in Mobile Ad Hoc Networks", Ninth International Symposium, Aug. 15, 2001, pp. 117-124.

(Continued)

Primary Examiner — Jason Mattis
(74) Attorney, Agent, or Firm — Buchanan Ingersoll & Rooney PC

(57) ABSTRACT

A wireless utility network contains a plurality of utility nodes that communicate within a wireless utility network. A gateway to the wireless utility network communicates with the utility nodes in the wireless utility network, and connects the wireless utility network to at least one other network. A packet is transmitted from one utility node to another utility node according to a route included in the transmitted packet. The route included in the transmitted packet is updated with received network information to determine an updated path cost of the included route and compared to alternate routes to select a preferred route based upon path cost. The selected preferred route is included in the packet and the packet is transmitted to another node according to the selected preferred route.

26 Claims, 22 Drawing Sheets

ROUTE SELECTION PROCESS

U.S. PATENT DOCUMENTS

| | | | |
|---|---|---|---|
| 2006/0215582 A1 | 9/2006 | Castagnoli et al. | |
| 2007/0008171 A1 | 1/2007 | Bowman | |
| 2007/0038743 A1* | 2/2007 | Hellhake et al. | 709/224 |
| 2007/0120705 A1 | 5/2007 | Kiiskila et al. | |
| 2007/0121486 A1* | 5/2007 | Guichard et al. | 370/216 |
| 2007/0127393 A1 | 6/2007 | Car | |
| 2007/0211636 A1 | 9/2007 | Bellur et al. | |
| 2007/0258473 A1 | 11/2007 | Ruffino et al. | |
| 2010/0157838 A1 | 6/2010 | Vaswani et al. | |

FOREIGN PATENT DOCUMENTS

| | | |
|---|---|---|
| WO | 2007081566 A2 | 7/2007 |
| WO | WO 2008/094296 A1 | 8/2008 |
| WO | WO 2008/097446 A1 | 8/2008 |

OTHER PUBLICATIONS

Fan Bai et al., "BRICS: A Building-Block Approach for Analyzing Routing Protocols in Ad Hoc Networks—a Case Study of Reactive Routing Protocols", 2000 IEEE International Conference on Paris, Jun. 20, 2004, pp. 3618-3622.
Hungarian Patent Office Search Report dated Aug. 19, 2010, 4 pages.
Invitation to Pay Additional Fees (Form PCT/ISA/206) corresponding to PCT/US 2008/006760 issued on Oct. 15, 2008.
Notification of Transmittal of the ISR and WO (Forms PCT/ISA/220 and PCT/ISA/210 and PCT/ISA/237) corresponding to PCT/US 2008/006760 issued on Mar. 4, 2009.

* cited by examiner

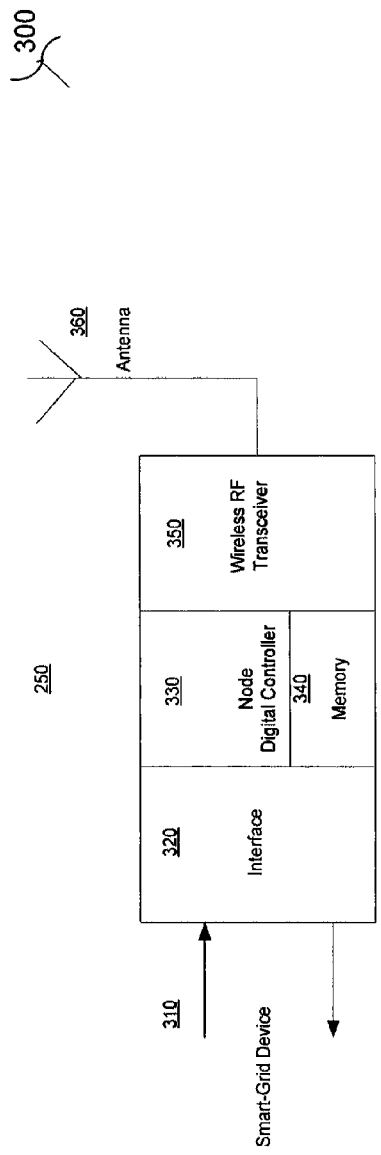
FIG. 3 WIRELESS NETWORK NODE
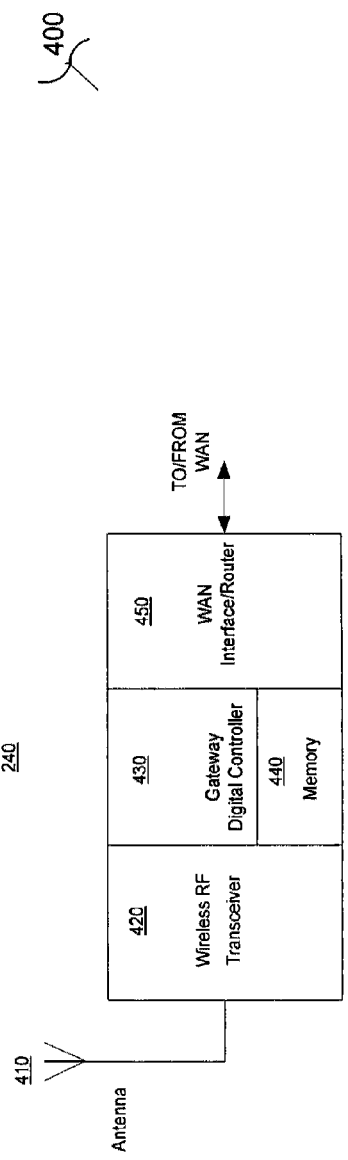
FIG. 4 WIRELESS NETWORK GATEWAY

NETWORK ADVERTISEMENT MESSAGE FORMAT

600

```
Network1] →

[Destination Address → ]

[ROUTE INFO TIME STAMP]

[Egress Node → GATEWAY ID]

[(Node1) (flag) (Link Cost) (Path Cost) (Type/Address) (Quality) ]

[(Node2) (flag) (Link Cost) (Path Cost) (Type/Address) (Quality) ]

[                   .....                                        ]

[(NodeN) (flag) (Link Cost) (Path Cost) (Type/Address) (Quality) ]

[Network2] →

[Destination Address → ]

[ROUTE INFO TIME STAMP]

[Egress Node → GATEWAY ID]

[(Node1) (flag) (Link Cost) (Path Cost) (Type/Address) (Quality) ]

[(Node2) (flag) (Link Cost) (Path Cost) (Type/Address) (Quality) ]

[                   .....                                        ]

[(NodeN) (flag) (Link Cost) (Path Cost) (Type/Address) (Quality) ]
```

FIG. 6

ROUTING TABLE EXAMPLE

FORMAT OF SOURCE REGISTRATION
MESSAGE WITH GATEWAY

Example of Route Discovery by Nodes
In a Smart-Grid Network

ROUTE SELECTION PROCESS

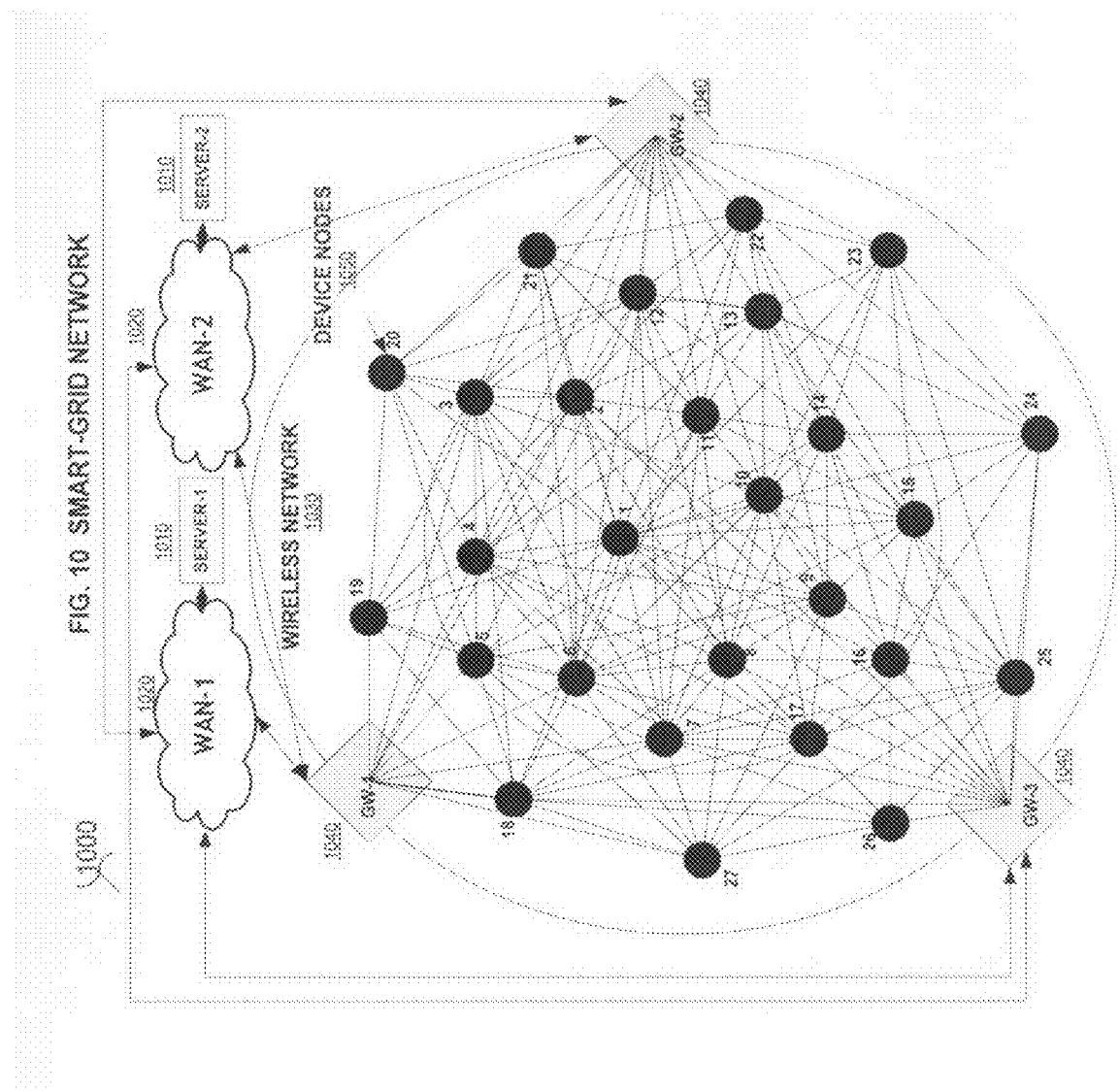

| NODE | POSSIBLE ROUTES TO GATEWAYS |
|---|---|
| 1 | 1>5>GW1; 1>4>GW1; 1>19>GW1; 1>6>GW1; 1>6>18>GW1; 1>4>19>GW1; 1>5>19>GW1; 1>6>5>GW1; <br> 1>12>GW2; 1>2>GW2; 1>22>GW2; 1>11>GW2; 1>11>12>GW2; 2>12>GW2; 1>2>21>GW2 <br> 1>16>GW-3; 1>9>16>GW3; 1>9>25>GW3 |
| 2 | 2>5>GW1; 2>4>GW1; 2>119>GW12>16>GW1; 2>1>(all 1>GW1 routes); <br> 2>GW2; 2>12>GW2; 2>21>GW2; 2>22>GW2; 2>13>GW2; <br> 2>GW3 (unstable); 2>9>25>GW3; 2>9>16>GW3; 2>8>GW3; 2>8>17>GW3; |
| 3 | 3>GW1 (unstable); 3>19>GW1; 3>4>GW1; 3>5>GW1; 3>5>18>GW1; 3>5>19>GW1; <br> 3>GW2 (long-hop); 3>12>GW2; 3>21>GW2; 3>2>GW2; <br> 3>1 (all 1>GW3 multi-hops); 3>(all 9>GW3 multi-hops); |
| 4 | 4>GW1; 4>19>GW1; 4>5>GW1; 4>5>18>GW1; <br> 4>GW2 (long-hop); 4>2>GW2; 4>3>GW2; 4>3>21>GW2; <br> 4>8>GW3; 4>17>GW3; 4>8>16>GW3; 4>9>25>GW3; |
| 5 | 5>GW1; 5>18>GW1; 5>19>GW1; 5>6>GW1; 5>4>GW1; <br> 5> (all 4>GW2 routes); 5>1 (all 1>GW2 routes); 5>2>GW2; <br> 5>6>17>GW3; 5>7>GW3; 5>27>26>GW3; |
| 6 | 6>GW1; 6>5>GW1; 6>18>GW16>7>GW1; <br> 6>(all 1>GW2 routes); 6>2>GW2; 6>4>GW2 (long-hop); 6>12>GW2; 6>3>GW2; 6>21>GW2; <br> 6>17>GW3; 6>7>GW3; 6>7>17>GW3; 6>8>GW3; 6>8>16>GW3; 6>8>9>25>GW3; |
| 7 | 7>GW1; 7>18>GW1; 7>6>GW1; 7>5>GW1; <br> 7> (all 1>GW2 routes); 7>11>GW2; 7>12>GW2 (long-hop); 7>11>12>GW2; <br> 7>GW3; 7>17>GW3; 7>26>GW3; 7>17>25>GW3; 7>16>GW3; 7>16>25>GW3; |
| 8 | 8>6>GW1; 8>7>GW1; 8>18>GW1; 8>7>18>GW1; 8> (all 1>GW1 routes); <br> 8> (all 1>GW2 routes); 8>11>GW2; 8>12>GW2; 8>2>GW2; 8>2>12>GW2; <br> 8>GW3; 8>16>GW3; 8>17>GW3; 8>9>16>GW3;8>17>16>GW3; 8>17>26>GW3; |
| 9 | 9>6>GW1; 9> ( all 1>GW1 routes); 9>8>18>GW1; 9>5>GW1; 9>8>6>GW1; <br> 9>13>GW2; 9>10>GW2; 9>10>11>GW2; 9>10>13>GW2; 9>10>11>12>GW2; <br> 9>16>GW3; 9>25>GW3; 9>16>25>GW3; 9>17>GW3; 9>17>26>GW3; |
| 10 | 10>6>GW1; 10> (all 1>GW1 routes); 10>5>GW1; <br> 10>GW2; 10>11>GW2; 10>11>12>GW2; 10>13>GW2; 10>13>22>GW2; 10>13>12>GW2; <br> 10>25>GW3; 10>15>GW3; 10>16>GW3; 10>9>16>GW3; 10>15>25>GW3; 10>17>GW3; |
| 11 | 11> (all 1>GW1 routes); 11>4>GW1; 11>7>GW1; 11>2>4>GW1; 11>2>5>GW1; 11>6>18>GW1; <br> 11>GW2; 11>12>GW2; 11>13>GW2; 11>22>GW2; 11>13>22>GW2; <br> 11>14>GW3; 11>14>15>GW3; 11>15>GW3; 11>15>25>GW3; 11>10>25>GW3; 11>10>9>16>GW3; |
| 12 | 12> (all 1>GW1 routes); 12>3>GW1; 12>2>4>GW1; 12>3>19>GW1;12>20>19>GW1; <br> 12>GW2; 12>22>GW2; 12>21>GW2; <br> 12>14>GW3; 12>14>16>GW3; 12>13>9>25>GW3; 12>13>9>16>GW3; |
| 13 | 13>2>5>GW1; 13>4>GW1; 13>4>5>GW1; 13>4>19>GW1; <br> 13>GW2; 13>12>GW2; 13>22>GW2; <br> 13>24>25>GW3; 13>15>25.GW3; 13>14>GW3 (long-hop); 13>14>16>GW3; 13>9>25>GW3; |
| 14 | 14> (all 1>GW1 routes); 14>10>6>GW1; 14>10>5>GW1; 14>11>4>GW1; 14>11>4>19>GW1; <br> 14>12>GW2; 14>13>GW2; 14>13>22>GW2; 14>23>GW2; 14>23>22>GW2; <br> 14>24>25>GW3; 14>15>GW3; 14>15>25>GW3; 14>16>GW3; 14>9>16>GW3; |
| 15 | 15> (all 1>GW1 routes); 15>9>5>GW1; 15>9>6>GW1; 15>6>GW1; <br> 15>23>GW2; 15>13>GW2; 15>14>13.GW2; 15>14>13>12>GW2; <br> 15>GW3; 15>25>GW3; 15>16>GW3; |
| 16 | 16> (all 1>GW1 routes); 16>7>GW1; 16>7>18>GW1; 16>7>5>GW1; <br> 16>15>22>GW2; 16>15>23>GW216>14>22>GW2;16>14>13>GW2;16>14>12>GW2; <br> 16>GW3; 16>25>GW3; 16>26>GW3; |

FIG. 11A

| NODE | POSSIBLE ROUTES TO GATEWAYS |
|---|---|
| 17 | 17>18>GW1; 17>7>GW1; 17>6>GW1; 17>7>18>GW1; 17>27>GW1; 17>27>18>GW1; 17>10>GW2; 17>10>13>GW2; 17>9>13>GW2; 17>9>14>13>GW2; 17>9>14>12>GW2; 17.GW3; 17>26>GW3; 17>25>GW3; |
| 18 | 18>GW1; 18>5>GW1; 18>6>GW1; Has no practical links to GW2; 18>26>GW3; 18>GW3 (very long-hop); 18>17>GW3; 18>27>26>GW3; |
| 19 | 19>GW1; 19>5.GW1; 19>18>GW1; 19>20>GW2 (long-hop); 19>20>21>GW2; 19>3>21>GW2; 19>2>GW2; Has no practical links to GW3; |
| 20 | 20>19>GW1; 20>5>GW1; 20>4>GW1; 20>3>GW1; 20>3>4>GW1; 20>GW2 (long-hop); 20>21>GW2; 20>3>GW2; 20>3>12>GW2; Has no practical links to GW3; |
| 21 | 21>3>GW1; 21>4>GW1; 21>4>5>GW1; 21>3>19>GW1; 21>4>19>GW1; 21>GW2; 21>12>GW2; 21>22> GW2; Has no practical links to GW3; |
| 22 | 22> (all 1>GW1 routes); 22>11>1 (all 1>GW1 routes); 22>11>6>GW1; 22>GW2; 22>12>GW2; 22>15>GW3; 22>15>25>GW3; 22>15>16>GW3; 22>14>16>GW3; |
| 23 | 23>1 (all 1>GW1 routes) but long-hops; 23>10>5>GW1; 23>10>6>GW1; 23>GW2; 23>22>GW2; 23>13>GW2; 23>15>GW3; 23>15>25>GW3; 23>24>25>GW3; 23>25>GW3; |
| 24 | No practical links to GW1; 24>23>GW2; 24>22.GW2; 24>13>GW2; 24>13>12>GW2; 24>25>GW3; 24>16>GW3; 24>15>GW3; 24>15>16>GW3; |
| 25 | 25>17>18>GW1; 25>7>GW1 (long-hops); 25>17>7>GW1; 25>23>GW2; 25>15>22.GW2; 25>24>22>GW2; 25>24>13.GW2; 25>GW3; 25>16>GW3; 25>26>GW3; |
| 26 | 26>18>GW1; 26>27>18>GW1; 26>27>GW1; 26>17>7>GW1; No practical links to GW2; 26>GW3; 26>25>GW3; 26>16>GW3; |
| 27 | 27>GW1 (long-hop); 27>18>GW1; 27>6>GW1; 27>5>GW1; 27>17>GW1; No practical links to GW2; 27>26>GW3; 27>17>GW3; 27>25>GW3; 27>17>16>GW3; |

FIG. 11B

| FIG. 11A |
|---|
| FIG. 11B |

FIG. 11

FIG. 12
NODES & PREFERRED GATEWAYS FOR EGRESS

1200

| NODE | PREFERRED GATEWAYS |
|------|--------------------|
|      | LISTED IN THE ORDER OF PREFERENCE OR REACHABILITY |
| 1    | GW1, GW2, GW3 |
| 2    | GW2, GW1, GW3 |
| 3    | GW1, GW2, GW3 |
| 4    | GW1, GW2, GW3 |
| 5    | GW1, GW2, GW3 |
| 6    | GW1, GW3, GW2 |
| 7    | GW1, GW3, GW2 |
| 8    | GW3, GW1, GW2 |
| 9    | GW3, GW1, GW2 |
| 10   | GW2, GW3, GW1 |
| 11   | GW2, GW1, GW3 |
| 12   | GW2, GW1, GW3 |
| 13   | GW2, GW3, GW1 |
| 14   | GW2, GW3, GW1 |
| 15   | GW3, GW2, GW1 |
| 16   | GW3, GW2, GW1 |
| 17   | GW3, GW1, GW2 |
| 18   | GW1, GW3, (GW2) |
| 19   | GW1, GW2, (GW3) |
| 20   | GW1, GW2, (GW3) |
| 21   | GW2, GW1, (GW3) |
| 22   | GW2, GW3, (GW1) |
| 23   | GW2, GW3, (GW1) |
| 24   | GW3, GW2, (GW1) |
| 25   | GW3, GW2, (GW1) |
| 26   | GW3, GW1, (GW2) |
| 27   | GW3, GW1, (GW2) |

NODE 1
ROUTE OPTIMIZATION**

Node 1:
Preferred Gateway: GW1

Routing Scenarios:

To GW1:

Possible Routes: 1>5>GW1; 1>4>GW1; 1>19>GW1; 1>6>GW1; 1>6>18>GW1; 1>4>19>GW1; 1>5>19>GW1; 1>6>5>GW1;

Routes via Initial Discovery: 1>4>19>GW1; 1>6>18>GW1;

Routes via Optimization 1: 1>5>GW1; 1>4>GW1; 1>6>GW1;

Route via Optimization 2; 1>5>GW1;

To GW2:

Possible Routes: 1>12>GW2; 1>2>GW2; 1>22>GW2; 1>11>GW2; 1>11>12>GW2; 2>12>GW2; 1>2>21>GW2;

Optimized Route: 1>12>GW2;

To GW3:

Routes via Initial Discovery: 1>16>GW-3; 1>9>16>GW3; 1>9>25>GW3;

Optimized Route: 1>9>16>GW3

**FIG. 14
NODE 11
ROUTE OPTIMIZATION EXAMPLE**

1400

**Node 11:
Preferred Gateway: GW2**

Routing Scenarios:

To GW2:

Possible Routes: 11>GW2; 11>12>GW2; 11>13>GW2; 11>22>GW2; 11>13>22>GW2;

Routes via Initial Discovery: 11>12>GW2; 11>22>GW2; 11>13>GW2

Routes via Optimization 1: 11>12>GW2;

Route via Optimization 2: 11>GW2

To GW1:

Possible Routes: 11> (all 1>GW1 routes); 11>4>GW1; 11>7>GW1; 11>2>4>GW1; 11>2>5>GW1; 11>6>18>GW1;

Optimized Route: 11>7>GW1

To GW3:

Possible Routes: 11>14>GW3; 11>14>15>GW3; 11>15>GW3; 11>15>25>GW3; 11>10>25>GW3; 11>10>9>16>GW3

Optimized Route: 1>15>GW3

FIG. 15
NODE 9
ROUTE OPTIMIZATION EXAMPLE

⟵1500

Node 9:
Preferred Gateway: GW3

Routing Scenarios:

To GW3:

Possible Routes: 9>16>GW3; 9>25>GW3; 9>16>25>GW3; 9>17>GW3; 9>17>26>GW3;

Routes via Initial Discovery: 9>16>GW3; 9>25>GW3; 9>16>25>GW3; 9>17>GW3; 9>17>26>GW3;

Routes via Optimization 1: 9>16>GW3; 9>25>GW3;

Route via Optimization 2: 9>16>GW3;

To GW2:

Possible Routes: 9>13>GW2; 9>10>GW2; 9>10>11>GW2; 9>10>13>GW2; 9>10>11>12>GW2;

Optimized Route: 9>13>GW2

To GW1:

Possible Routes: 9>6>GW1; 9> ( all 1>GW1 routes); 9>8>18>GW1; 9>5>GW1; 9>8>6>GW1;

Optimized Route: 9>6>GW1

FIG. 16
RETURN ROUTES TO NODES FROM GATEWAYS
EXAMPLE

1600

| Gateway | Route | Node 1 | Node 9 | Node 11 |
|---|---|---|---|---|
| GW1 | Received Packet Route ← | 1>5>GW1 | 9>8>6>GW1 | 11>7>GW1 |
| | Return Packet Route → | *GW1>5>1* | *GW1>6>8>9* | *GW1>7>11* |
| GW2 | Received Packet Route ← | 1>2>21>GW2 | 9>10>13>GW2 | 11>12>GW2 |
| | Return Packet Route → | *GW2>21>2>1* | *GW2>13>10>9* | *GW2>12>11* |
| GW3 | Received Packet Route ← | 1>9>16>GW3 | 9>16>GW3 | 11>10>25>GW3 |
| | Return Packet Route → | *GW3>16>9>1* | *GW3>16>9* | *GW3>25>10>11* |

ROUTE SET-UP

NODE PROCESS CONTROL

GATEWAY ROUTING TABLE UPDATE PROCESS

METHOD AND SYSTEM OF ROUTING IN A UTILITY SMART-GRID NETWORK

FIELD OF THE INVENTION

The field of the invention relates to the use of communications systems to monitor, control and report on commodity delivery systems.

SUMMARY OF THE INVENTION

An integrated network platform is disclosed for monitoring and controlling different components and devices of the utility smart-grid. The platform consists of one or more wireless networks and at least one wide area network, interconnecting several families of networked smart-grid monitoring and control devices with the network management servers ("servers") via a number of gateways. Each gateway is equipped with a controller, packet formatter, at least one rf transceiver, a network router, and memory. Each network node interfaces with the utility grid component (for example transformer, substation, feeders, consumer location meters), and communicates with the servers via one of the gateways in a wireless network. Each of the network nodes has at least one unique network address, preferably an IPv4 or IPv6 address and a Layer-2 MAC address. The nodes are configured to perform any one of the following functions: (a) to receive sensor or utility meter reading data signals from one of the plurality of smart-grid devices and to transmit a data message using a packet communication protocol; (b) to receive and execute command signals from the smart-grid management server, and send back status reports; (c) to receive and execute device reconfiguration, software updates, security updates, etc., and send back status signals; (d) to participate in the outage detection function of the smart-grid by responding to polling, event reporting, etc.

The network device and the gateway may both develop and use optimized routing information for the device to send/receive its data messages to/from the egress point (gateway). The optimized routing information developed by the network device may be referred to as "local" routing information. The information developed and optimized by the gateway and made available to each network node is referred to as the "centralized" routing information. The route optimization process by each network node includes analyzing and utilizing actual link and path costs based on a novel technique disclosed. The node selects the route based on one of least possible hops, most robust hops, lowest traffic hops, fastest hops, or one based on the results of the link/path cost algorithm.

The gateway also collects available routing information for each of the network nodes registered with it in the wireless network for egress. The gateway also collects and analyzes link and path costs relevant to each of the nodes, and optimizes the routing table based on an analysis of the advanced link/path cost calculations. The gateway will select the route based on one of least possible hops, most robust hops, lowest traffic hops, fastest hops, or one based on the results of the link/path cost algorithm. The gateway also updates the routing information in the routing tables based on an analysis of packets received from different nodes via one or more intermediate nodes. The gateway propagates the latest routing information to each of the nodes in the wireless network in a unicast mode or in response to a request from a node for the latest routing information.

During the "local" routing information optimization, a node operating on a battery, may select a route of one or more hops to the egress point based on battery charge impact, and utilize a route based on the lowest battery charge impact. A node may also utilize constant powered nodes as intermediate hops instead of battery powered intermediate nodes as a "network policy", except in emergencies. Route selection may also be based on information regarding battery-operated nodes as to the condition of the batteries (newest/freshest, fully-charged vs low on charge, etc.). In one particular embodiment, the route selection by the source node and the gateway may be based on the latest link condition information of neighbor nodes received by the source node and the gateway.

The gateway maintains information in the routing table as to the identification of battery-powered nodes, and each node at its discretion may utilize this information in route selection.

One other key link and network parameter that each node and the gateway may measure and utilize in route optimization involves ambient noise level. This parameter in a network impacts overall network efficiency, and mostly is linked to transmitted power levels of all the nodes in the network. Lower transmit power levels collectively result in lower ambient noise, and contribute to achieving good link quality at smaller transmit power levels, and also achieving improved network throughput, also referred to as "network efficiency'.

In the preferred embodiment described here, a network node may be registered with and be part of one or more wireless networks and the associated gateways. The node therefore has one or more egress points for its data messages, and will have separate optimized routing information for each of the wireless networks it belongs to. Each node will have a unique layer-2 and MAC network address for each of the networks it belongs to. This is called multi-egress/multi-ingress network configuration.

BRIEF DESCRIPTION OF DIAGRAMS

FIG. 3 is a functional diagram of the utility network node, according to one possible embodiment.

FIG. 4 is a functional diagram of the wireless network gateway, according to one possible embodiment.

FIG. 6 is an example of the routing table at the source node, according to one possible embodiment.

FIG. 10 is an example of routing discovery and optimization process in a smart-grid wireless network, according to one possible embodiment.

FIG. 11 is an example routing table developed during route discovery and optimization process, according to one possible embodiment.

FIG. 12 is an example of the discovery of preferred gateways for egress by nodes in the example smart-grid wireless network, according to one possible embodiment.

Figure 13:
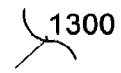

FIGS. 13, 14, and 15 are three examples of route optimization process by three nodes in the example smart-grid wireless network, according to one possible embodiment.

FIG. 16 describes an example of return (downstream) route selection by gateways to source nodes in the example smart-grid wireless network, according to one possible embodiment.

Figure 17:
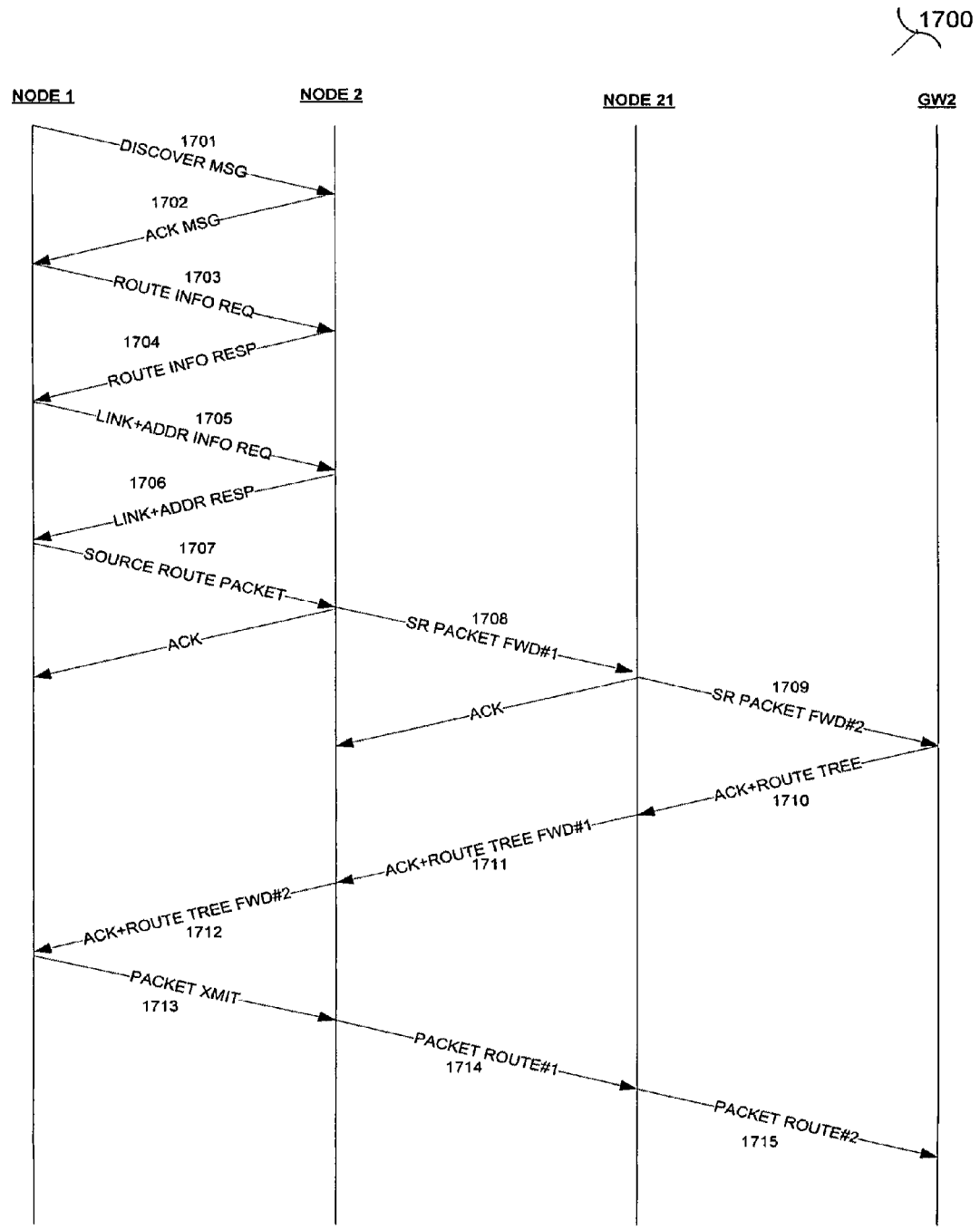

FIG. 17 is a flow diagram of the step-by-step route set-up process, according to one possible embodiment.

Figure 18:
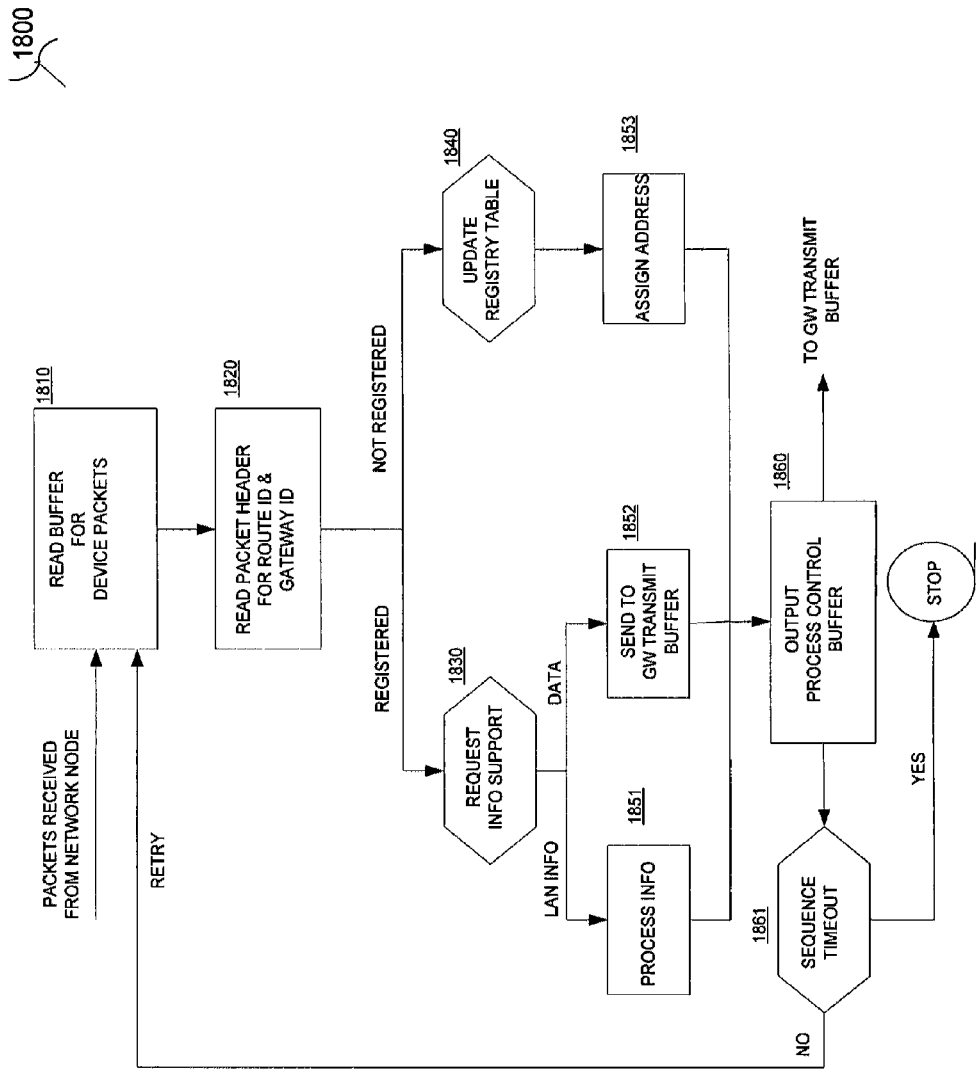

FIG. 18 is a description of gateway process control for node registration, according to one possible embodiment.

Figure 19:
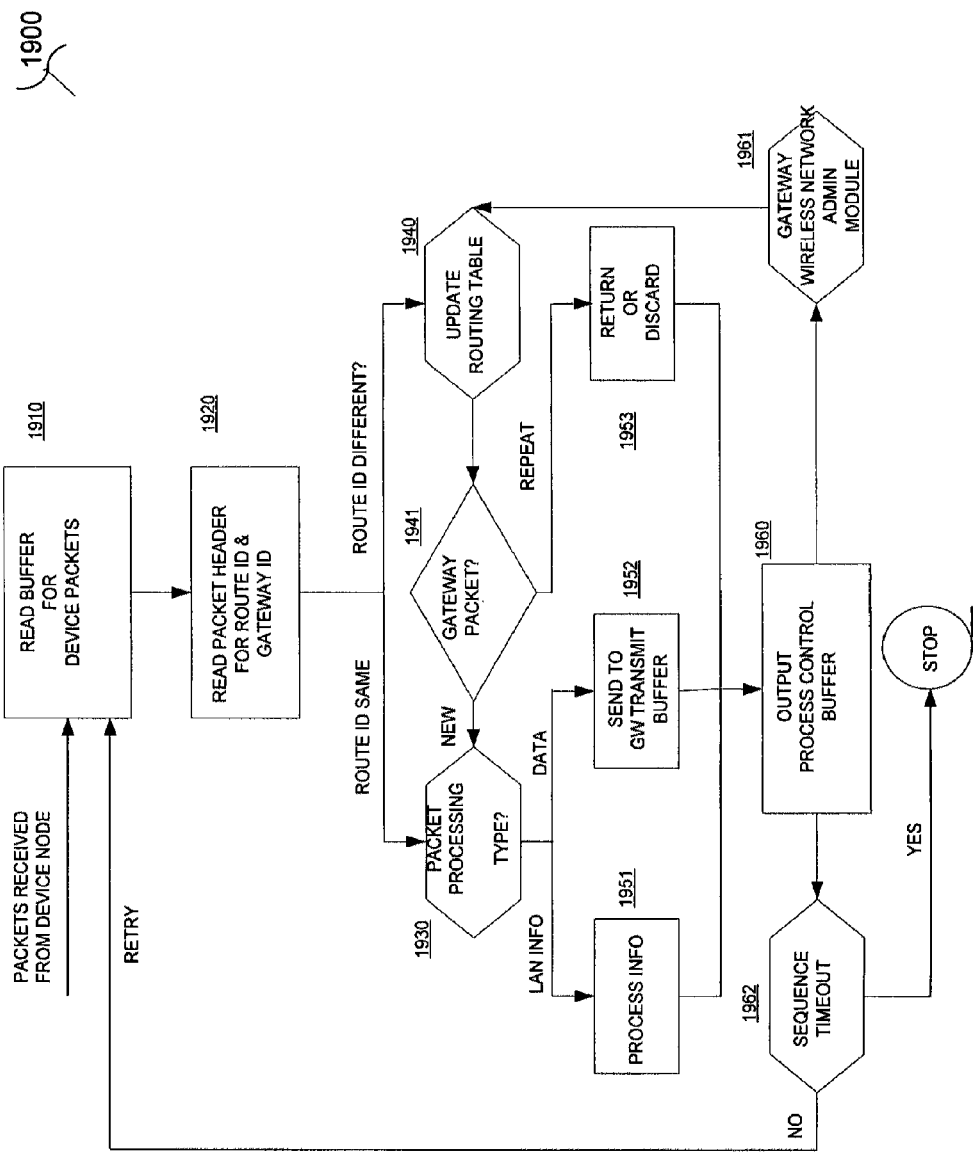

FIG. 19 is a description of gateway process control during routing process, according to one possible embodiment.

Figure 20:
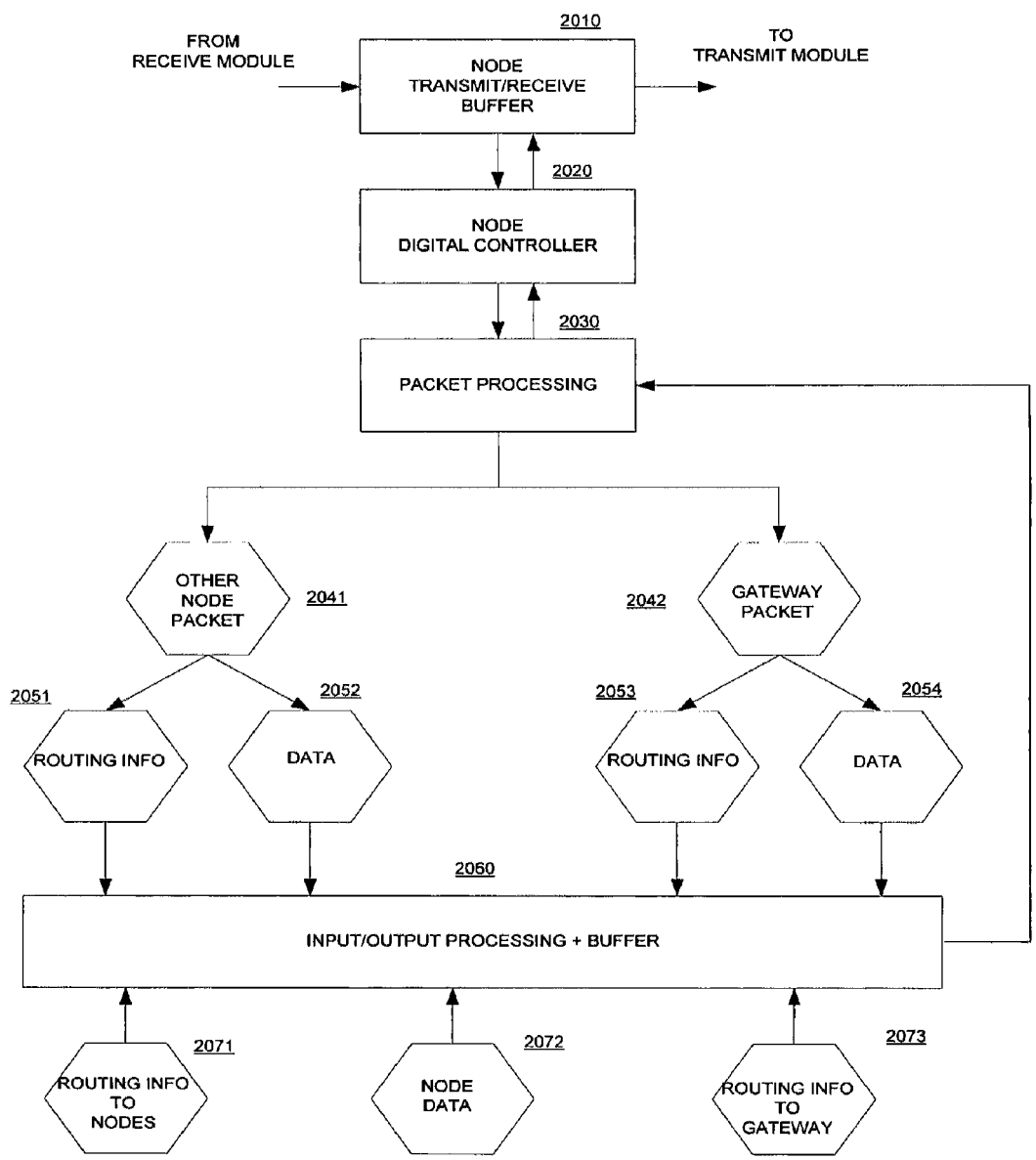

FIG. 20 is an example of node controller process control for packet processing for routing, according to one possible embodiment.

Figure 21:
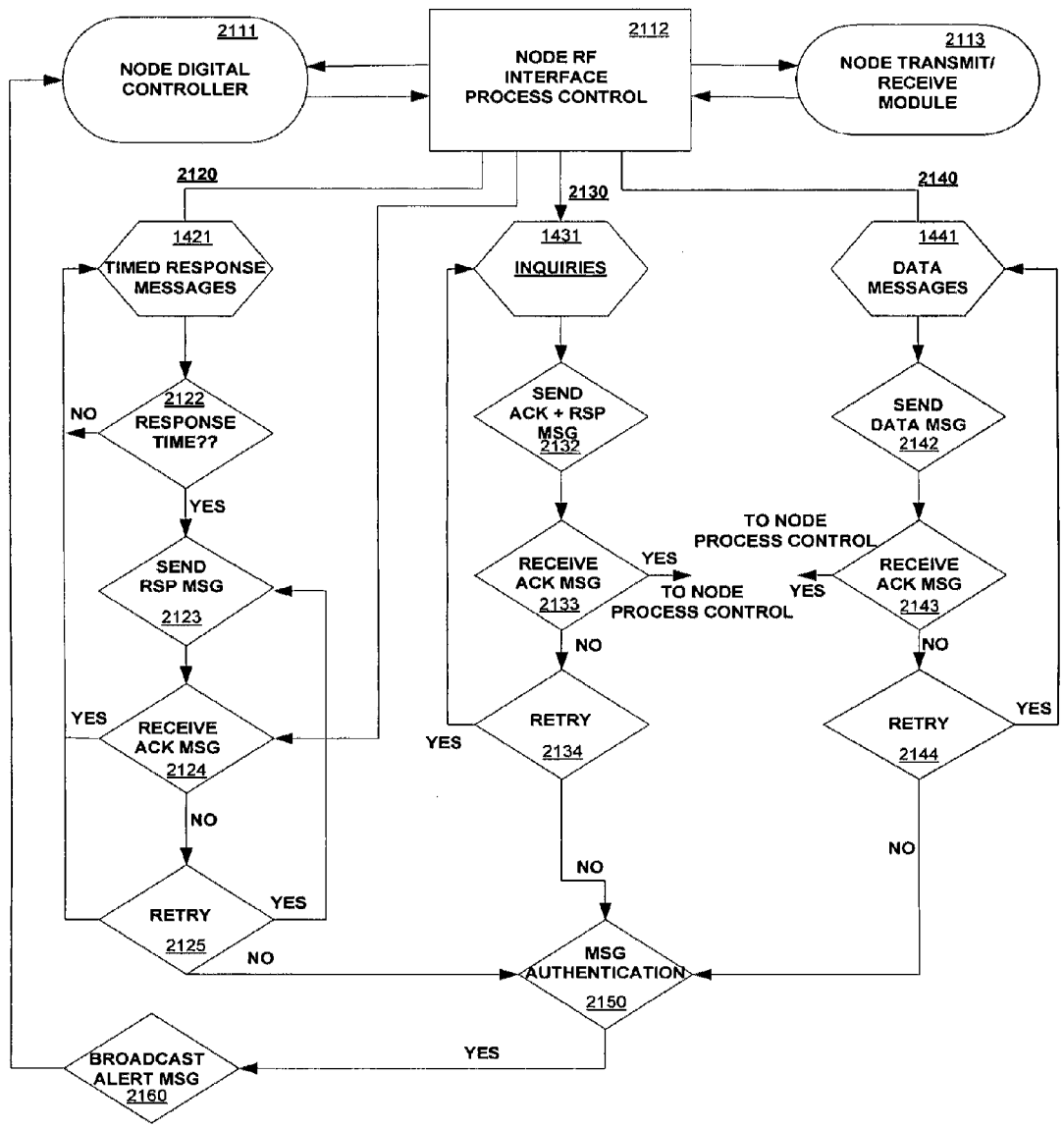

FIG. 21 is an example of node RF interface process control for packet processing, according to one possible embodiment.

Figure 22:
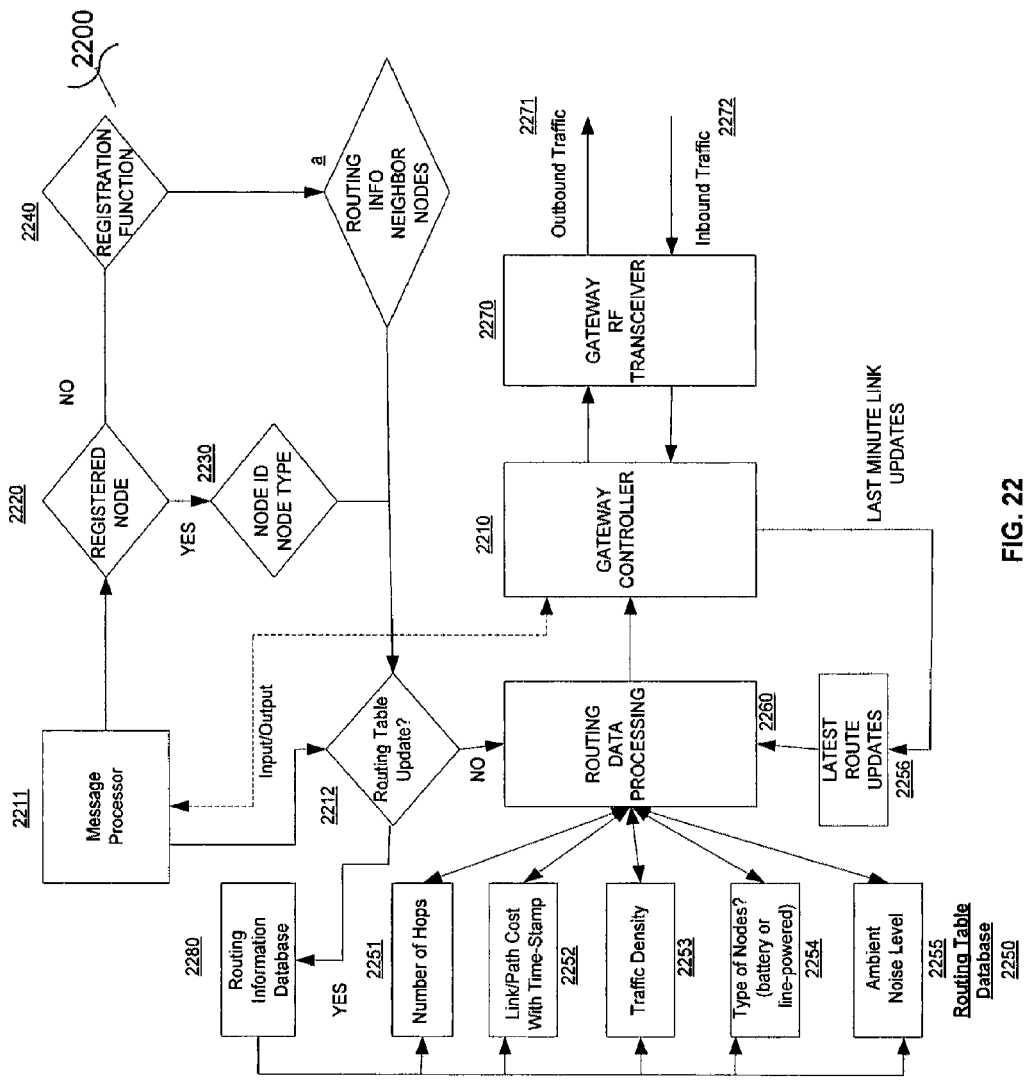

FIG. 22 is an example of a gateway routing table update process, according to one possible embodiment.

DETAILED DESCRIPTION OF PREFERRED EMBODIMENTS

Smart-Grid Network

The electric utility grid typically consists of:
power generation (distributed sources)
transmission & switching (very high voltage)
distribution network (lower voltages)
customer and in-premise power delivery and monitoring electronics Unless otherwise noted, the term utility will be used to refer to electric utilities. The utility industry is transitioning from a radial system linking generation to load to a true interactive digital network with full connectivity and interoperability from energy generation management to the end customer energy use. This full-capability, network-based utility infrastructure has been referred to as a smart-grid. The network supporting the two-way, dynamic information flow is often referred to as the smart-grid network. Unless otherwise noted, the term smart grid network will be used to refer to a utility network, which may, but need not, include all four components listed above. Once implemented, the smart-grid network can also support auxiliary networks and devices like the in-premise networks that monitor and control in-home appliances and facilities. It should also be noted, that smart grid networks and/or utility networks may be used with other commodity delivery systems operated by utilities, for example water and gas. A given utility network may include more than one type of commodity, for example electricity and gas, allowing the control and/or monitoring of both commodities.

In one preferred embodiment the smart-grid network consists of device nodes and gateways in one or more wireless networks in two-way communications with the servers via WANs and private networks. One embodiment described herein provides intelligent two-way packet routing capability in the distribution segment of the smart-grid network that can be flexibly expanded to facilitate two-way information flow among all components of the smart-grid.

Figure 1:
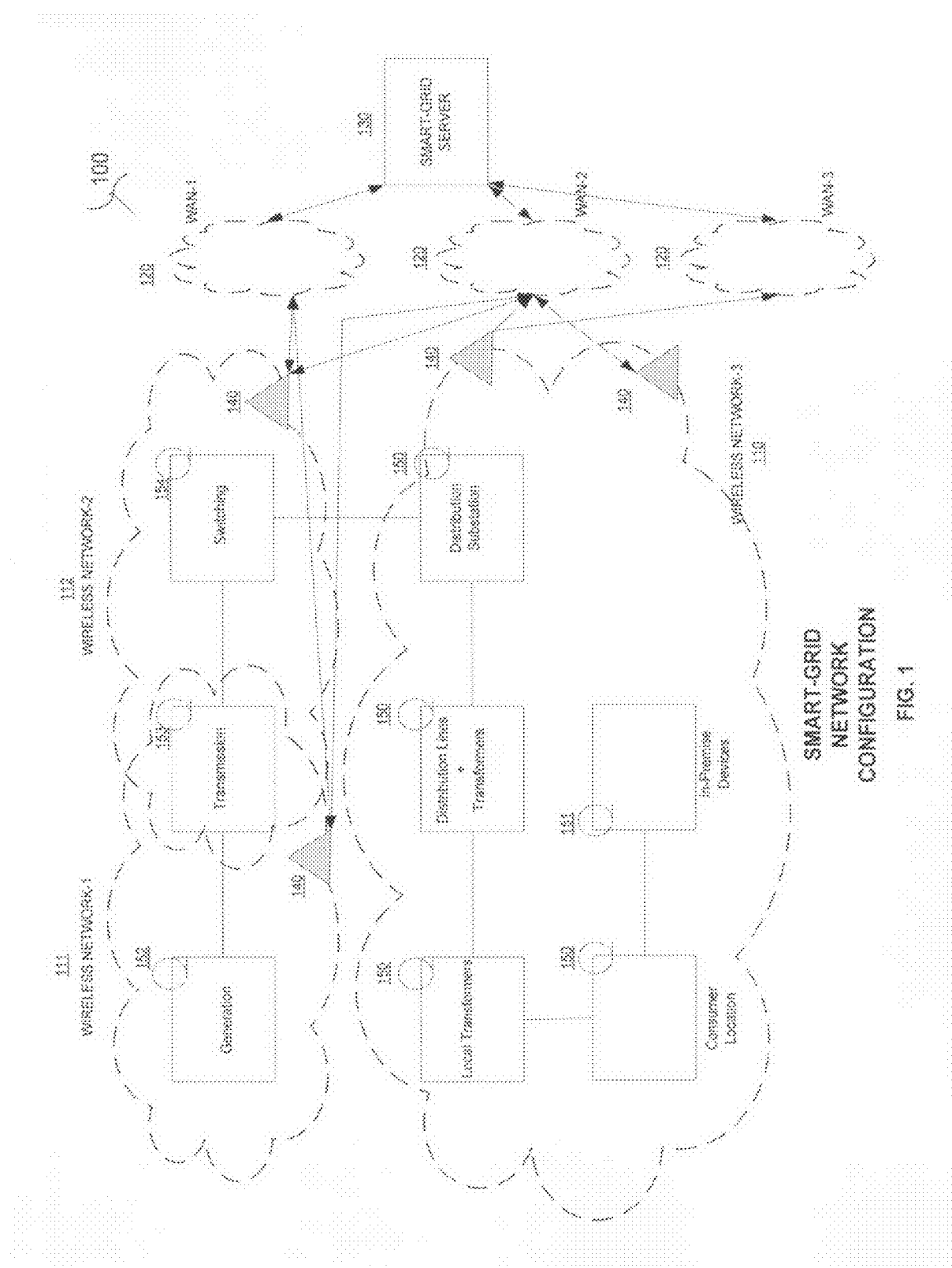
FIG. 1 is a graphical representation of the smart-grid network that describes the network configuration that overlaps the smart-grid physical infrastructure, according to one possible embodiment.

FIG. 1 describes a smart-grid network that overlaps the components of the utility smart-grid infrastructure. The networked devices 150, located at the distribution monitoring and control devices of the smart-grid are part of a wireless network 110 which may have more than one gateway 140. The gateway 140 connects the wireless network nodes 150 to the smart-grid server 130 reachable via a second network WAN 120. There may be more than one WANs 120 and more than one server 130. There may be other wireless networks 111 and 112 in the smart-grid network providing remote monitoring and control of other components of the smart-grid (for example: energy generation facilities, high voltage transformer stations, high voltage arterial transmission lines, and high voltage switching stations). The networked devices 152, 153, 154 in these wireless networks are in two-way communications with the smart-grid server 130 via one or more gateways 140 and one or more WANs 120.

As shown, the smart-grid server is in a second network (WAN, Internet, Intranet, other). The second network may be an IP network (IPv4 or IPv6). Other types of second networks may also be utilized within the capabilities of this invention.

Standard routers, bridges and other network interfaces may be used to connect the gateway 140 with the second network and the smart-grid server 120. The wireless network 110 may include one or more gateways 140. The gateway 140 is, in the presently preferred embodiment, the main interface between the devices of the first network (wireless network) and the smart-grid server in the second network (WAN), and provides all needed packet reformatting and address translation services. In one presently preferred embodiment, the gateway 140 may be implemented as a server with a RF radio and radio controller, allowing the gateway to communicate with other devices having a radio in the wireless network. Unless otherwise noted, the terms gateway and access point are to be considered interchangeable. The wireless network may utilize a different type of packet formatting than the second network. If the wireless network uses a non-IP packet structure or a different IP packet structure than the second network (for example: IPv6 vs IPv4, X. 25 vs IPv4, etc.), the gateway performs the necessary protocol translation before forwarding packets between the first network and the second network.

The preferred embodiment is described in the context of the distribution part of the smart-grid network. To those skilled in the art, the methods and systems disclosed herein are equally applicable to other components or sub-components of the smart-grid network. The distribution part of the smart-grid network is described in FIG. 2. The wireless network-1 230 consists of a Gateway-1 240 and a plurality of network nodes 250 (described as 251, 252, 253, . . . ). The gateway 240 is connected to the smart-grid server-1 210 via WAN-1 220. In different embodiments, there may be more than one gateway in the wireless network-1. Similarly, there may be more than one wireless networks in the smart-grid distribution network, more than one WAN connecting each wireless network to one or more smart-grid servers.

In the example embodiment here are at least three classes of network device nodes in the wireless network. Nodes labeled CPD are constant-power network nodes which are powered by the load line of the grid at the device location (typically electric meter locations). Nodes labeled BPD are battery powered nodes typically located with devices that cannot be powered by the grid load line (examples are: nodes located at water meters, gas meters and nodes at electric meters which for some reason have to located further away from the meter and cannot draw power from the load line). Another type of nodes are labeled R and they act as relays or repeaters that actively repeat, retarget, re-form the packets from neighbor nodes further upstream towards the gateway or downstream towards the intended node. The relays may be pole mounted and close to power sources and may be backed up by batteries. A certain number of CPD nodes may also have battery back-up so they can continue to function in case of grid power outages. In some embodiments, the device nodes have to operate on battery because of location further away from the electric power source where the meters may be located.

The functional components of the device nodes and the gateway in the wireless network are described in FIG. 3 and FIG. 4.

As shown in FIG. 3, device node 300 may include device interface 320, node digital controller 330, storage memory 340, wireless RF transceiver 350 (or radio) and antenna 360. Device interface 320 may connect to a smart-grid device (not shown). The node digital controller (or node controller) may manage the two-way information flow, routing data analysis, route optimization, route selection, message creation and processing, and command/control/monitoring functions. In the preferred embodiment, the RF transceiver 350 and antenna 360 operate in the frequency band 902-928 MHz band and use one of DSSS CDMA, FHSS CDMA, and OFDM radio access technologies. Other frequency bands and modulation schemes are entirely feasible within the capabilities of this invention. Data speeds ranging from <1 kb/s to over 1.0 Mb/s in the wireless network are easily accommodated with current wireless technologies. Note, node device 300 may also be referred to as a node within the wireless network, or may be referred to as a utility node. The node subsystems may be referred to as node controller and node radio.

The wireless network 230 includes one or more of gateways 240, and the gateway is described below in FIG. 4. Gateway 400 may include a WAN Interface/router 450, a memory 440, a gateway digital controller (or gateway controller) 430, and a wireless RF transceiver 420. The WAN/Interface router 450 maintains a two-way digital packet communications link via one or more WANs 220 with one or more smart-grid servers 210. The wireless RF transceiver 420 and antenna 410 maintains two-way packet communications link with each network device node 250. The gateway digital controller manages two-way information flow with the WAN and the wireless networks, routing data analysis, route optimization, route selection, message creation and processing, command/control/monitoring of smart-grid devices via the network nodes, maintaining registration and address tables of all network nodes, and related functions. The gateway may also function as a proxy for the smart-grid server in executing the requests and commands within the smart-grid network. In embodiments where the gateway is implanted as a server, as noted above, the gateway controller may be referred to as the server controller. Additionally, in such embodiments, the gateway transceiver may be referred to as the server transceiver, or server radio.

Packet Routing in Smart-Grid Wireless Network

The preferred embodiment of packet routing in the distribution component of the smart-grid wireless network is discussed herein and an example embodiment is provided.

Routing System

In the preferred embodiment, the routing system may include the following components:
Route paths discovery
Path information maintenance
Node registration with Gateway and upstream neighbors
Routing table at the gateway
Route optimization and update
The presently preferred embodiment of the routing subsystem utilizes the code entity DLF (Data Link Forwarder) for Layer 2 routing and the code entity MLME (Media Access Control Sub-Layer Management Entity) for acquiring neighbor nodes and maintaining timing information between neighbors. The DLF interfaces to the MLME through a set of APIs.

Route Paths Discovery

Figure 2:
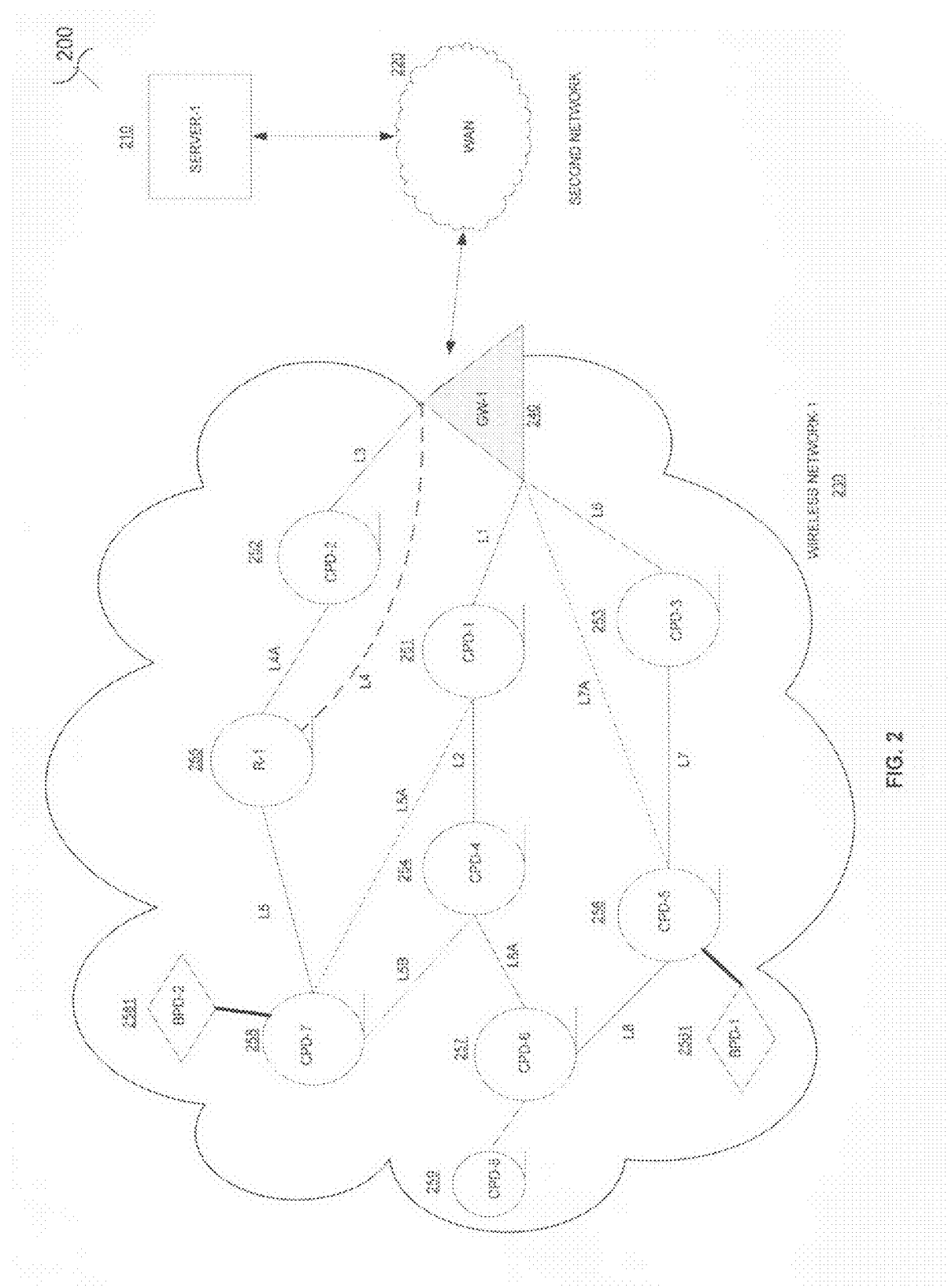
FIG. 2 is a routing map of the nodes in the utility wireless network, according to one possible embodiment.

This process is illustrated utilizing FIG. 2.
Nodes such as CPD-7 257 and R-1 255 (applies to all CPD and R nodes) may initiate network discovery when, for example:
  It has no viable egress nodes (it is not associated with any gateways)
  Communications with upstream nodes have been severed, either administratively, or due to path failure or propagation loss
  A periodic registration message to one of the gateways of the wireless network it is registered with has failed at least 3 times
  A new wireless network is advertised through incoming messages from other nodes
  Nodes such as BPD-1 2561 and 2581 may initiate network discovery, for example, if the links to their nominated master (CPD nodes 256 and 258) have been severed.

In the example embodiments a node discovers neighboring nodes using two basic processes: broadcast discovery and neighbor queries. When a node comes up, the MLME may find all of the node's adjacencies (or directly connected RF links) through a "broadcast discovery process". It may do this randomly to determine when it should start sending broadcast discovery frames. In the preferred embodiment, this process guarantees that a broadcast discovery frame is sent on a wireless network operating in the frequency band 902-928 MHz. That this process may be conducted with other radio access methods and in other frequency bands as well.

In the example embodiments there are two modes to broadcast discovery: aggressive and passive. When powered on, the device may enter aggressive discovery mode where it sends out discovery frames at randomized intervals which may be in the order of milliseconds. It may enter passive discovery mode when the aggressive discovery duration has expired. In passive discovery mode, a node may wait a much longer time between sending broadcast discovery frames, typically of the order of minutes.

Once the discovery process has found a neighbor (adjacency), or a set of neighbors, the MLME may then query the discovered neighbors for their direct neighbors (preferably, all of the direct neighbors will be provided in response). This may be done to discover the network environment more quickly (in contrast to broadcasting a large number of frames in hopes of contacting any one particular device). The neighbor query mechanism is preferably a simple query/response: a node receiving a neighbor query applies the criteria to, preferably, all nodes in its list and, preferably, all the nodes that "match" the criteria are placed in the neighbor response. If no criterion is given, all the nodes in the list may be placed in the neighbor response.

The MLME may notify the DLF when discovery is over i.e. all (preferably) nodes have been queried for their neighbors and an attempt has been made to reach those neighbors.

Using the list of neighbors built up by the MLME the DLF may try and find advertised egress routes. It may accomplish this task by listening for "Network Advertisement" (NADV) messages from the devices in the MLME's neighbor table.

Figure 5:
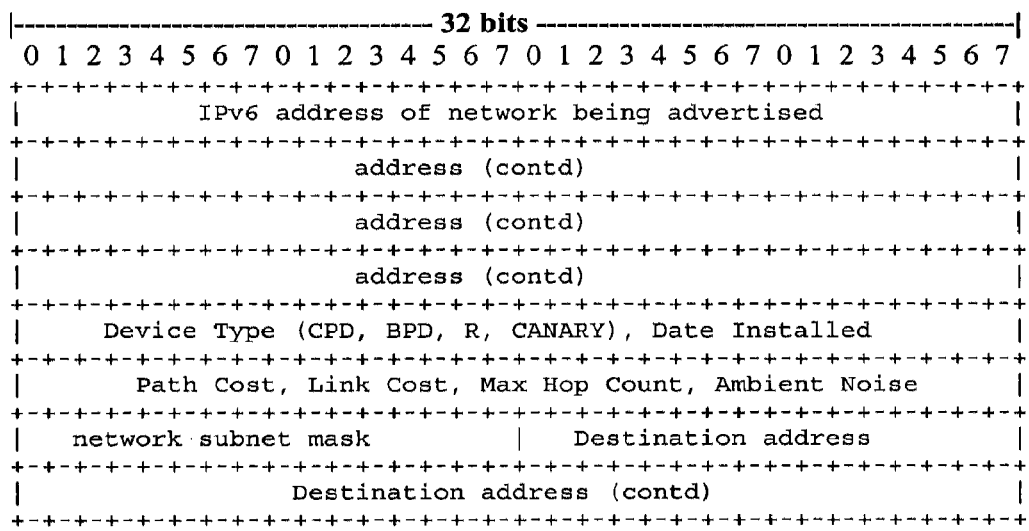
FIG. 5 is an example of network advertisement (NADV) message format, according to one possible embodiment.

The NADV message may advertise a set of egress routes, which may include the path cost and hop count of the egress routes. Path cost is the lowest cost associated with that egress (ΔP), amongst all candidate paths. Hop count is the highest number of hops that must be taken to reach that egress. Hop count is used to prevent routing loops, and is not used in conjunction with the path cost. The format of the NADV message is shown in FIG. 5. The Destination address is the MAC or Layer-2 IP (IPv4 or IPv6) address of the node the network advertisement is ultimately coming from. In most cases it is the egress point (or the gateway) since networks are identified by their egress (gateway) nodes.

From the advertisements received in the form of NADV messages, each node can construct a routing table listing the networks available, the egress node (gateway) identifying each of the networks, and the available paths to that egress node. Preferably, each of the available paths is described with a hop sequence, flags describing the type of path, and the link and path costs. The flags indicate the kind of route—whether it is a permanent entry in the table, whether it can be advertised by the receiving node etc. In the preferred embodiment, the node will decide to register with one or more upstream nodes for which the total cost (link and path costs) to the network are low. Other embodiments may use other criteria including validated reliability of the link in providing long-term egress to the network. Registered nodes may get preference in routing. Other information received as part of the NADV message may include type of device (BPD, CPD, R, CD) and date installed. Those nodes which have accumulated ambient network noise data may also include that information. This noise threshold is an indictor of aggregate network traffic within reception range. This level determines the transmit power needed at each node to reach a neighbor at a suitable bit-error rate (BER). If all nodes transmit at lower average aggregate power, the noise level will be lower and permits more nodes to be accommodated in the frequency band, thus improving network efficiency. This is an important factor in densely populated networks.

Other embodiments may consider attributes in NADV such as: typical traffic load at that node, date of its installation and commissioned into service. Other embodiments may include typical traffic density at the node, back-up battery power availability, and other attributes that are useful in establishing reliable routing map by the source node. As can be seen in FIG. 6, the routing table is organized to reflect all paths for egress via a set of routes and the information regarding each hop in that route. For example, there may be two gateways (egress points) that the source node is registered with. For each, in the example shown in FIG. 6, one route is shown. For each route, there can be N hops. For each hop of each route, the routing table maintains link cost, path cost, type of node, address, quality/traffic information, other pertinent information received via NADV process. There can be more than one route listed in the routing table for each network egress point. This information is constantly updated to reflect the latest network conditions.

From the routing table information, nodes may construct a packet forwarding or routing table with a string of destination addresses (L2 or MAC), a type associated with each address, other relevant factors about the nodes, performance factors, and the path cost for egress. In the presently preferred embodiment, the type reflects the selection preference associated with the destination and may be one of the several: (1) source-routed/locally discovered; (2) source-routed/received from gateway; (3) hop-by-hop; (4) direct adjacency route; (4) bread-crumb route picked up from tracking passing network traffic.

FIG. 6 provides an example of the route types that may be listed. In the presently preferred embodiment case of a source route type, it is listed along with the next hop (Node 1) from the source node. In the case of a destination of the source-routed type, an array of hops is explicitly stated (Node 1 . . . N) with the destination in the forwarding table. Multiple entries for the same destination may be listed in the order of preference, which may be determined both by the type flag, device type, message type, and the path cost. In the presently preferred embodiment, when trying to reach a Destination Address, the node will first use the first entry in the routing table for egress via preferred gateway, with the routing table entries being maintained in a linked list in order of increasing path cost and link cost. In other embodiments, the routing algorithm allows for the routing information maintained at the source node to create a source route entry for each destination, by structuring a forward set of paths to the destination address. Yet, in other embodiments, the node will use the bread-crumb route it had picked up from passing traffic at some point in time.

Path Information Maintenance

In the presently preferred embodiment, upstream and downstream neighbors who are in the routing table as the Node 1 or 2 in the hopping sequence of the preferred routes in the routing table, are constantly maintained via MLME beacons or targeted periodic keepalive messages used for synchronizing the clocks and assuring that nodes can still exchange packets with each other. This constant contact and feedback may be used by the L2 routing layer for multiple purposes, which may include:

Neighbor updates are communicated to downstream devices in timing update beacons.

Nodes use the MLME to detect if their downstream or upstream has gone away.

A node's upstream link characteristics may change, for example, when:

Upstream node goes away

A new preferred upstream is detected

Link quality changes (smoothed over time)

In the presently preferred embodiment, these rules are applied recursively, to all upstream nodes in a path. When an adjustment occurs, the node recalculates the costs to each of its egress nodes. When a node's cost to its upstream changes the cost to one of the networks it routes through in a statistically significant manner as set by a threshold, it distributes this information in the next set of MLME beacons to its downstream nodes.

In the presently preferred a change in network information is propagated with a "Neighbor List" message, with the protocol type field set to 0x2 indicating that a partial list of changes is being distributed. In one embodiment, this can reflect adding new networks or changing the cost of existing networks. When an upstream disappears, causing a particular network effectively become no longer routable, a "Neighbor List" message is sent with the protocol type set to 0x3 to indicate that the network has been removed from the upstream nodes network list.

In the presently preferred embodiment, gateways are notified about changes in network topology by the periodic network registration messages that are unicast to it. These messages may be sent by every node within the gateway's network by the gateway, as part of its routing information propagation process, and may contain a complete list of their upstream nodes, and/or the link costs to each of them.

In the presently preferred embodiment, the MLME keeps two smoothed averages that can be used by the DLF for determining link costs for routing purposes: a smoothed RSSI and a smoothed info success percentage. The term "smoothed" refers to the type of averaging done on the data. In the presently preferred embodiment, the averaging uses the formula: smoothed average=A*average+B*sample; B=(1−A). This type of averaging does not require a large amount of memory for storage (as opposed to storing the last N samples) and also has a controllable amount of "history". The term history refers to how much the new value affects the current smoothed average. This may be controlled by the A and B values: large A values mean that the average has more history than smaller A values. Other embodiments can use other averaging techniques that are desirable under the prevalent network conditions.

The RSSI is the received signal strength indicator. This value may be measured for all frames received from a node. Preferably, when any frame is received from a node, the RSSI of that frame is averaged into the smoothed RSSI using the averaging formula.

In the presently preferred embodiment, the "info" success percentage criterion is used along with the smoothed RSSI calculation as the best measure of link quality and therefore in making routing decisions. The "info" success percentage is a record of the packet success rate. The term "info" is used to denote frames other than the ones that started the communications. The first frame sent to a node targeted on its hopping sequence can fail due to interference or due to the receiver being busy. The info success percentage, in including only those frames that the targeted node is listening for and not the frames at the start of the communications, provides a link quality measure that does not vary greatly with the load of the receiver. The info success percentage is considered to be the best indicator of link quality.

Node Registration with Upstream Neighbors and Gateways

Each node may explicitly register with the upstream nodes it intends to use for routing in a network. This registration means that the upstream node will now attempt to keep up-to-date timing information about the registering node, and keep a downstream routing table entry. This assures that traffic can not only flow towards the egress, but also back to the node.

The node registers with its upstream node by sending it an "Upstream Register" message. The "Upstream Register" message contains the device ID, device's type, and neighborhood cost (neighborhood health metric). The neighborhood health metric is used to cull downstream nodes when an upstream becomes overloaded. Nodes with a low neighborhood health metric (and therefore presumably low path diversity) are preferentially selected before nodes with high neighborhood health metrics. The neighborhood cost is the neighborhood health metric based upon a combination of the numbers of potential and active upstream nodes.

Potential upstream nodes either positively or negatively acknowledge "Upstream Register" message using an "Upstream Registration Acknowledgement" message. A node's "Neighborhood Health" is updated based on the value of this acknowledgement. Potential upstream nodes give less weight than acknowledged upstream nodes.

The "Upstream Registration Acknowledgement" message may include the sequence number sent by the requestor in the "Upstream Registration" message. The status code of the response can be one of the following:

0x0, Node successfully added
0x1, Node failed to be added
0x2, Node rejected due to high load
0x3, Node is already being maintained A node may register itself with one or more gateways by sending a unicast "Gateway Register" message (GREG). The GREG message contains the list of addresses of nodes in the gateway's network that the registering node uses as upstream nodes, and the link cost associated with each of these upstream nodes. It may also contain a list of other candidate networks (represented by the egress nodes of those networks), and their cost. Essentially, the source node forwards its routing table information to each gateway it is registered with, and updates that information on a regular basis or when changes occur.

Figure 7:
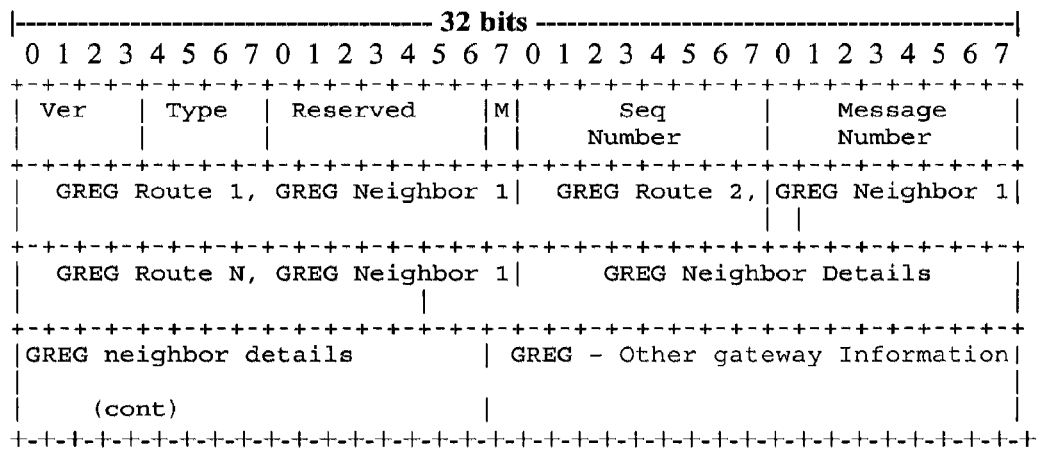
FIG. 7 is an example of the format of source node registration message with the gateway, according to one possible embodiment.

The format of the GREG message is given in FIG. 7. The Type is set to indicate it is a GREG message. The M bit is set if there is more data to send. Seq Number is the sequence number of the registration message. Message number is used when the registration message is sent in multiple parts. Each GREG Route describes all routing table entry information for that route (number of hops, hop node addresses, link and path costs, node types), and all possible routes to the egress point are identified by the first upstream node in the paths used by the registering node.

When the node is successfully registered with the gateway, the gateway will place the node in its routing table, and keeps up to date state information of the node. The node sends periodic registration messages and routing table updates to the gateway (on the order of every 12 hours or when changes occur in the routing table). The gateway will update its routing table when it sees subsequent gateway registration messages from the source node. If the gateway misses three consecutive registration messages, the node will be culled from the gateway's routing table, and it will need to re-register itself. In some embodiments, the gateway may send a notice message to the source node asking it to re-register along with its routing table entries. As will be discussed below, in some embodiments, the gateway also develops routing information for each registered source node in its network, and propagates that information to the source nodes. This information is identified as the "gateway routing table" to differentiate it from the "source routing table". The source node has the option of selecting routes from either one of the tables or merging the two on a regular basis, during the route optimization process, and discarding redundant entries.

In response to a successful first time registration, the gateway may send down network configuration information. This may include, among other things, the gateway's globally routable IPv6 prefix, gateway's MAC address, DNS server address, network transmission timers and any other variables relating to L2/L3 routing.

If a gateway becomes overloaded with too many nodes it can begin to cull nodes that have other candidate networks, and such discontinuation message to the affected nodes. It may evaluate this by looking at the different networks reported in the GREG messages, and may remove the healthiest candidates from the network. In some embodiments, the gateway may simply store the routing information of a discontinued node in a separate folder and may reinstate that information in certain contingencies when a node sends an exception message and short-form registering. This will trigger a quick registration process and the gateway will provide the source node egress support and also unicast the stored routing table information to that node.

Example of Route Discovery

Figure 8:
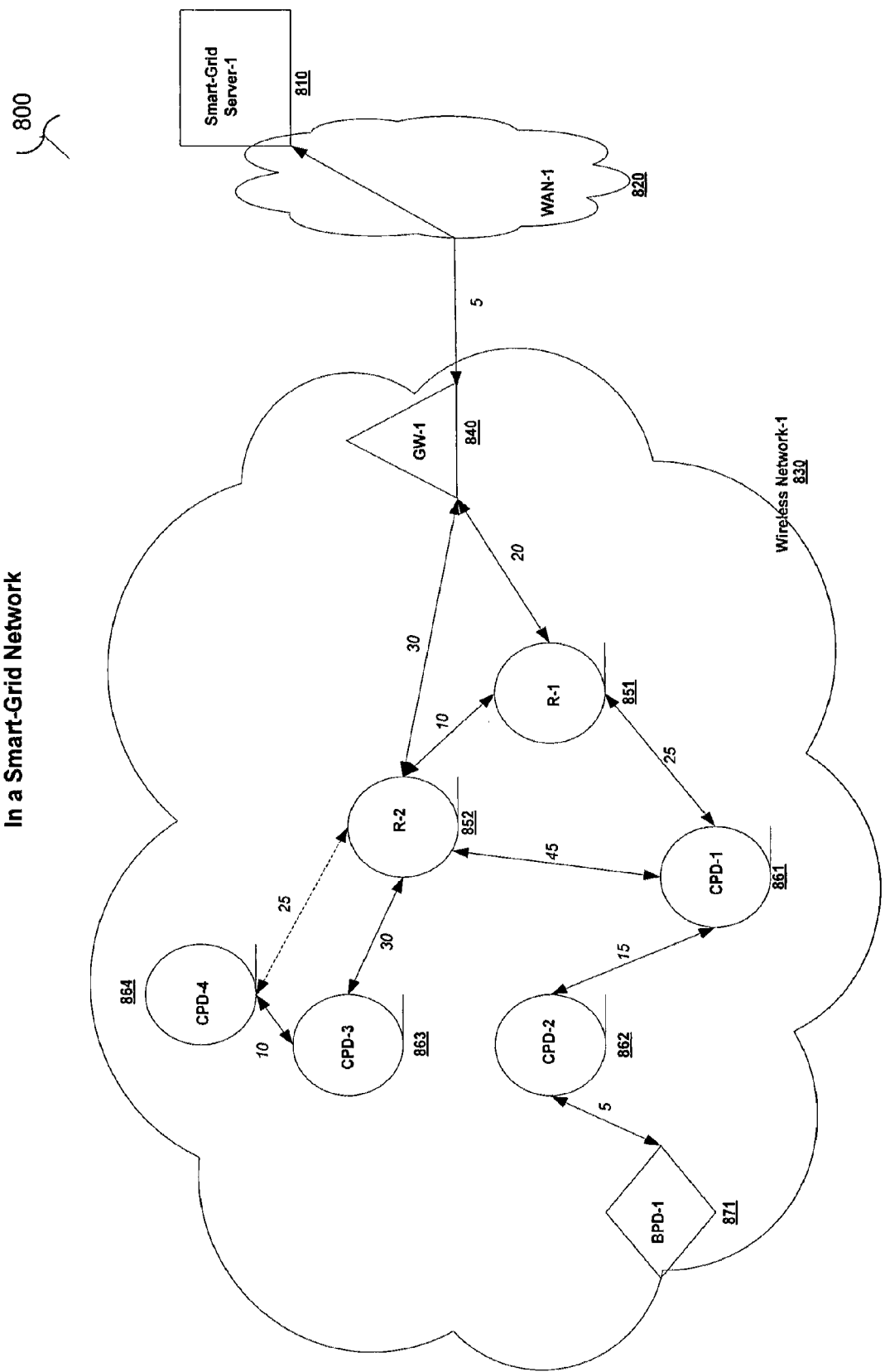
FIG. 8 is an example of route discovery by the nodes in a smart-grid network, according to one possible embodiment.

The presently preferred process of a node coming up and discovering a route can be summarized as follows using the FIG. 8. FIG. 8 shows a few nodes in a wireless network 830 connected via gateway 840 to a smart-grid server 810 in a WAN 820. The nodes are: Relays R-1 851 and R-2 852; Constant-powered device nodes CPD-1 861, CPD-2 862, CPD-3 863, CPD-4 864; Battery-powered device node BPD-1 871. The network may actually consist of a large number of nodes, one or more gateways, one or more wireless networks, one or more WANs and, one or more smart-grid servers. Relays R-1 851, R-2 852, and Gateway GW-1 840 are assumed to be already up. This example describes the nodes (CPD and BPD) whose process of coming up in the network is described below. Tables 1a and 1b lists the link costs of all the links that are detected and established. It must be noted that as the nodes continue their operational life, they will detect additional nodes and routes which offer improved egress.

TABLE 1a

| | WAN-1 (820) | GW-1 (840) | R-1 (851) | R-2 (852) | CPD-1 (861) | CPD-2 (862) | CPD-3 (863) | CPD-4 (864) | BPD-1 (871) |
|---|---|---|---|---|---|---|---|---|---|
| WAN-1 (820) | x | 5 | — | — | — | — | — | — | — |
| GW-1 (840) | 5 | x | 20 | 30 | — | — | — | — | — |
| R-1 (851) | — | 20 | x | 10 | 25 | — | — | — | — |
| R-2 (852) | — | 30 | 10 | x | 45 | — | 30 | 25 | — |
| CPD-1 (861) | — | — | 25 | 45 | x | 15 | — | — | — |
| CPD-2 (862) | — | — | — | — | 15 | x | — | — | 5 |
| CPD-3 (863) | — | — | — | 30 | — | — | x | 10 | — |
| CPD-4 (864) | — | — | — | 25 | — | — | 10 | x | — |
| BPD-1 (871) | — | — | — | — | — | 5 | — | — | x |

TABLE 1b

| Link | Link Cost |
|---|---|
| GW-1(840) ↔ WAN-1(820) | 5 |
| R-1 (851) ↔ GW-1 (840) | 20 |
| R-2 (852) ↔ GW-1 (840) | 30 |
| R-1 (851) ↔ R-2 (852) | 10 |
| CPD-1(861) ↔R-1(851) ↔GW-1(840) ↔WAN-1 (820) | 50 |
| CPD-4(864) ↔CPD-3(863) ↔R-2(852) ↔GW-1(840) ↔WAN-1(820) | 75 |
| BPD-1(871) ↔CPD-2(862) ↔CPD-1(861) ↔R-1(851) ↔WAN-1(820) | 70 |
| CPD-4(864) ↔R-2(852) ↔GW-1(840) ↔WAN-1(820) | 60 |

When CPD-1 861 comes up, MLME neighbor scan discovers R-1 851 and R-3 852 adjacency in the first step. Upon establishment of adjacency, R-1 851 and R-3 852 send Network Advertisement messages. Specifically, in the second step, R-1 851 sends a Network Advertisement message advertising one egress route to WAN-1 820 via GW-1 840 The message contains the MAC Address of GW-1 840, the network address class or subnet mask (IPv6 or IPv4 address), the adjacency cost to CPD-1 861 as seen by R-1 851, the maximum number of hops it takes to reach the egress node (2), and the lowest cost of the path out to the network (50). This is registered in the form [R-1 851 sends NADV (25, MAC_ADDRESS(GW-1 840), 2, 40)]. It is to be noted that R-2 852 does not advertise the direct route it has to GW-1 840 in its response to CPD-1 861, because the path cost is greater than that advertised by R-1 851; but the path cost information of egress route via R-2 is made available to CPD-1 in subsequent query. In a mature network, CPD-1 861 may receive more than one NADV messages from neighbor nodes with link and path costs. The third step results in CPD-1 861 calculating the total cost of networks by adding the path cost and link cost and creating an ordered list of next upstream hops to use and creating a routing map for each option in the order of increasing path cost. In the fourth step, CPD-1 861 attempts to register with R-1 851 by sending an Upstream Registration message to R-1 851 reporting no other possible node for this egress. The fifth step occurs when R-1 851 sends an Upstream Registration Acknowledgement message to CPD-1 861 accepting it as a node for routing support in both directions. CPD-1 861 is accepted because it has no other viable node for this egress. In the sixth step, CPD-1 861 attempts to register with GW-1 840 by sending Gateway Registration Message. It reports R-1 851 as an upstream node it intends to use. The seventh step follows where GW-1 840 accepts CPD-1 861 by sending Gateway Registration Acknowledgement Message and passes CPD-1 861 the network configuration (notably IPv6 address, DNS address, GW-1 840's network prefix). This now enables CPD-1 861 to use GW-1 840 for network egress via the route it has initially determined as described above.

In a mature network, CPD-1 861 may repeat this process with other upstream nodes it has found to be viable for routing to the same gateway or other gateways in the wireless network it belongs to. The process is similarly repeated if the node CPD-1 861 belongs to more than one wireless networks.

Next, in the eighth step, CPD-1 861 sends a Dynamic DNS (RFC 2136) UPDATE message to the WAN-1 DNS server with its IPv6 address through GW-1 840. The node repeats this DNS registration for each network it belongs to via the gateway that is providing network egress support.

FIG. 8 can be used to illustrate two more examples regarding CPD-4 864 and BPD-1 871. CPD-4 864 establishes a three hop route to GW-1 840 via CPD-3 863 and R-2 852 for egress at a total cost of 75 (see Tables 1 a & b), and registers with GW-1 840 and with the DNS server.

BPD-1 871 similarly discovers and registers with GW-1 840 a 4-hop route via CPD-2 862, CPD-1 861, and R-1 851, at a total cost of 70. BPD-1 871, being a battery-powered node, will take into account the lowest path cost it can achieve. In one embodiment, BPD-1 871 depends on the line-powered node (in this case CPD-2 862 to conduct route discovery process and registration.

The method for updating routes when a change occurs in the network is illustrated using an example of an alternate route discovery by CPD-4 864 in wireless network 830. The changed route is depicted in FIG. 8 with the only difference being the dotted line indicating that the node CPD-4 864 has found a lower cost, 2-hop route to GW-1 840, with the total path cost for egress is now 60, instead of the previous 3-hop route cost of 75. This discovery takes place in routine neighbor maintenance process by the source node, and by listening to any messages or route advertisements from neighbors.

First, R-2 852 updates CPD-4 864 via MLME and notifies that it has an egress route to GW-1 840 for total path cost of 60 as an upstream forwarding path. CPD-4 864 then recalculates total cost of networks by adding the path cost and link cost and creates a reordered list of next upstream hops to use. Upstream node CPD-3 863 has a total cost of 75 while upstream node R-2 852 has a total cost of 60. R-2 852 is therefore preferred now and placed above CPD-3 863 in the list. The re-ordered list of route information is shown in Tables 1a & 1b. Finally, CPD-4 864 sends the updated information to GW-1 840 via its next periodic Gateway Registration message.

In one presently preferred embodiment the routing protocol described herein is designed to exploit the collective computing resources of the network nodes in addition to relying on one gateway at the root of the wireless network to calculate and distribute routes to all nodes. The source node selects a preferred set of an ordered multiplicity of upstream routes to go out to a WAN network through one or more gateway based upon the egress route advertisements with the associated path costs for each route and each hop. Upon failure of the primary route upstream or to the gateway, the fall back to secondary routes and/or gateways in the source node's database is immediate without any wait for a routing algorithm to re-converge since the routes are already pre-converged.

In one presently preferred embodiment, each node registers itself with all the upstream nodes it intends to use. The upstream node can now keep a downstream routing table entry for that node. Traffic destined for a source node can now be routed with a set of hops from the routing table entry along with their addresses. Of course, the destination address is routinely included. Source routing where the entire ordered list of nodes through which the packet has to pass is explicitly stated by the gateway in the message header is also within the scope of this algorithm. The routing protocol disclosed in this invention allows each node to have multiple routes through a set of preferred neighbor nodes with the best egress route solution. The current invention avoids open-ended route discovery loops in its source routing technique by constantly updating its preferred path to take into account any link failure data, and also by updating routing table entries by including better route options that the source node becomes aware of by routine discovery process, and by listening to all NADV messages from neighbor nodes. The source node also advertises to its downstream neighbors all egress routing options it has maintained in the routing table.

The example routing protocol described herein has provisions for "breadcrumb" routes which are alternate routes gleaned by a node from traffic passing through it. "Breadcrumb" routes are discarded from the node's routing table when the allocated memory is full and when they turn stale after a specified amount of time. These routes, which are in addition to advertised routes, serve to expand the list of redundant links available to a node for ensuring successful transmission of a packet.

The example routing protocol described herein enables the sorting and preferential ordering of next hops available to a node to route packets to a destination in an IPv6 network. The sorting logic may vary in different implementations. In the current embodiment, the sorting logic uses both the origin of the route information as well as the path cost to the destination and link cost to the desired hop. For example, a next hop picked up from a "bread-crumb" route that was gleaned from passing traffic using an infrequent path is given less preference than a route tagged as being used frequently via one or more neighbor nodes which have provided attractive path costs and have been used regularly by the source node. Multiple next hops within the "bread-crumb" category or the "multi-hop" category would be sorted into an ordered list according to the path cost.

With a node being allowed to register on multiple networks (resulting in the node getting multiple IP addresses) and the DNS server capable of sorting these IP addresses according to configurable policies for resolving the node's hostname, there is now a method for controlling ingress of traffic into the wireless network.

Routing Table at the Gateway

As described earlier, each source node registers with the gateway and forwards the routing information (routes) and the immediate "first nodes" for each route to the gateway. The information also contains link cost, path cost, node types, addresses of all intermediate nodes in the routing table, preferred routes, ambient noise information, and information regarding battery operated devices. The gateway stores this information in a format similar to the example shown in FIG. 6. Other formats for the routing table may also be used, but the information content will be the same. This information is compared by the gateway with the routing information that it develops for each node in the wireless network. The gateway may have the network topology information and the location of each node. It initially constructs a working route for each node utilizing the least number of hops. The information is augmented with an analysis of packets received from various nodes in the network. The routing information in the received packets, and related information such as path and link costs and node types is compared against the initial entry that the gateway has for each node. The comparison results in an updated routing table. The process for updating the gateway routing table is illustrated in FIG. 22. If update information is missing for some nodes, the gateway can send REQ messages to those nodes and request responses. The responses will lead to the routing table update. If no responses are received in three separate attempts, the gateway may broadcast a message to the node's neighbors and seek response from them regarding whether they have a path to the intended node. If all attempts fail, the gateway removes the node from its registration list. The node will have to re-register to seek network egress.

The gateway routinely sends the routing table updates to each node in the network in a unicast message. In some embodiments, a node at any time may request the gateway to provide the latest routing table information. This information about available routes to a node for egress is also made available to its neighbors if requested.

Each node will have a routing table database that may be a combination of locally generated routes and gateway supplied routing table, and will include all pertinent information such as link/path costs, node types, number of hops, characteristics of the intermediate nodes, ambient noise level, and signal quality information for each hop. Each node can use this information in route selection, route optimization, and NADV messages to neighbor nodes seeking egress routes to the gateway.

Route Optimization & Update

The optimization process therefore may involve several factors present in the smart-grid network environment. In some cases, new blockages may render some routes inoperable, removal of blockages or availability of new neighbors or relays may open up new paths, and signal conditions may force use of certain routes even if they are multi-hop. The ultimate objective in a stable network is to facilitate robust and reliable delivery of packets from the network nodes to the smart-grid server via one of the gateways in the wireless network. As discussed in FIG. 8, nodes may constantly discover new routes with lower link and path costs. Each time such a new route option is detected, it is confirmed with the first forwarding node in the new route. The information is registered with gateway during the routine re-registration message exchange. After receiving ACK message from the gateway and the immediate first node of the new route, the new route is added to the routing table, and all redundant or inoperable routes are purged from the routing table. The gateway does similar updating of its routing table regularly for all the nodes. The source node monitors link and path conditions, and regularly updates the link and path costs and quality parameters in the routing table, and re-prioritizes the list based on the latest available information. Various optimization processes may be used with the various embodiments.

Route Selection

Figure 9:
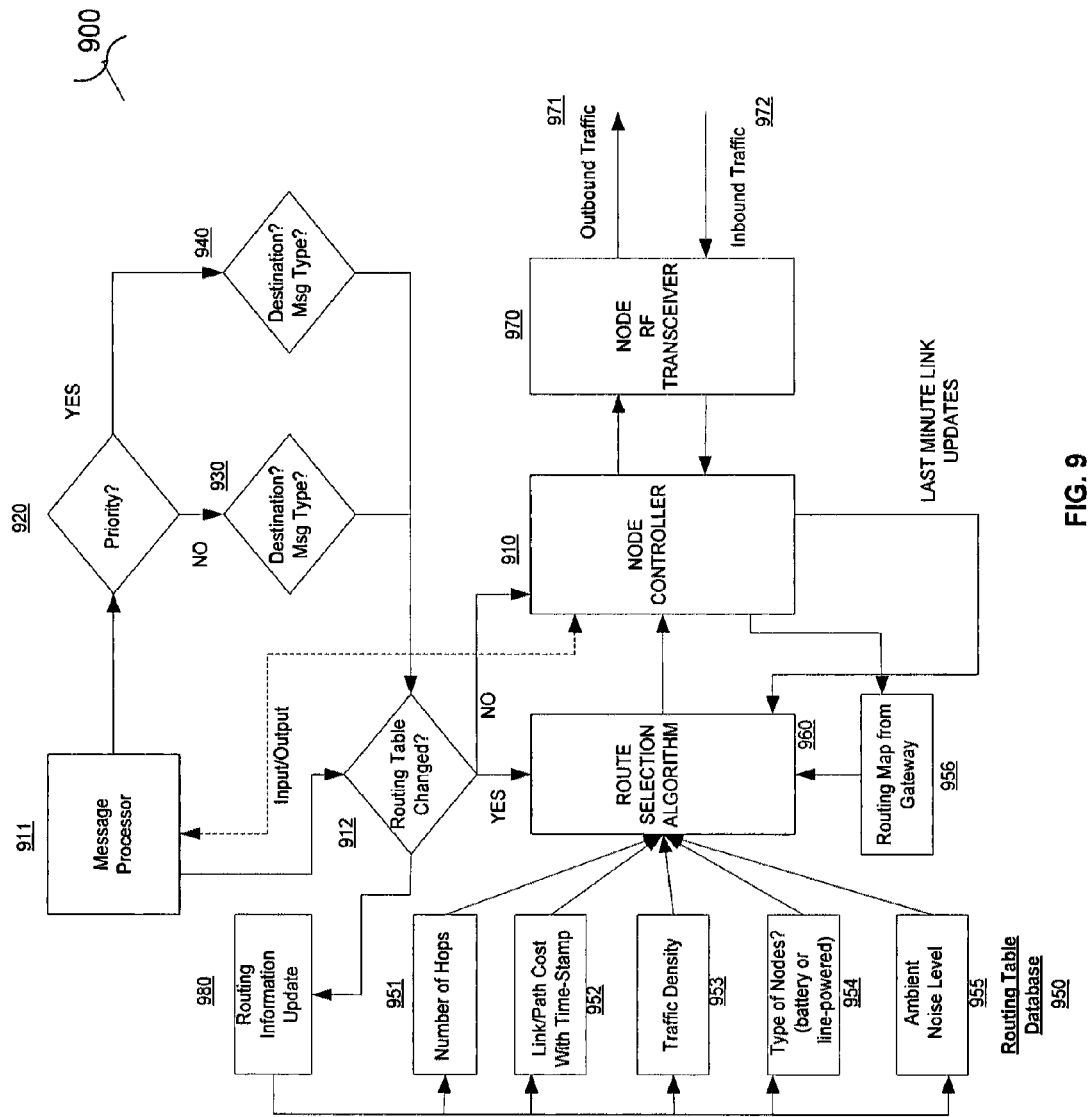
FIG. 9 is a description of route selection process at a network node, according to one possible embodiment.

The source node selects routes for each message utilizing the route selection algorithm, as described in FIG. 9. The process may need to be repeated only if the Message Processor 911 receives a flag from the Node Controller that the routing table has changed for the destination address since the previous time a message was sent.

Node Controller 910 initiates a message request and also sends a flag 912 on any routing table update or status to Message Processor 911. The Message Processor 911 sorts out the message priority 920. If it is a normal message, the message type and destination address information is developed 930. If it is a priority message, special flags, message type and destination address are developed 940. The outputs of 930 and 940 are fed back to the Routing Table Update function 912 of the Message Processor 911. If there are no updates, the message is appended with the pre-selected destination routing map (with a string of addresses of intermediate nodes, flags, destination address, link and path costs, message type, device type), and returned to Node Controller 910 for forwarding to Node RF Transceiver 970. The Node RF Transceiver 970 may add any MAC address and primitives, and transmit the message to the first node in the routing map.

If the Routing Table Update function 912 has received a flag that there has been a routing table update, the message is forwarded to the route selection algorithm 960. The route selection algorithm 960 regularly analyzes the routing table database 950 and sets up priority lists, purges obsolete and redundant routes, updates link and path costs, updates device types, sets up special rules associated with conserving battery power, and other pertinent factors. The routing data base 950 has a prioritized set of routes for each network and each egress point in that network. The route map includes, number of hops 951, link/path costs 952, traffic density at intermediate nodes of the route 953, node features (line power, battery power, installation date, reliability factors) and link/path quality information (RSSI, Info Success Rate, Ambient Noise) 955. The route selection process 960 also has the gateway-provided routing map 956 in the database for use in the route comparison and selection process.

The route selection algorithm selects the preferred route map to use to route the message to the destination taking into account all the factors affecting reliable and fast delivery of the message at the lowest path cost at minimal impact on network noise level, battery power, traffic balance at each intermediate node. In some embodiments, the route selection algorithm may have the latest information available on the link conditions of the hops in the routing map, localized power outages, and other factors that may impact successful packet delivery, and may base its route selection on the latest available information.

The output of the route selection algorithm may be fed back to the Message Processor Function 911 of the node Controller 910 with the appended routing map information. The suitably structured message is sent to Node RF Transceiver 970 for adding any MAC primitives and transmitting to the first node in the routing map.

Example of Packet Routing in the Smart-Grid Wireless Network

FIG. 10 provides an example of a smart-grid network and packet routing. The example network consists of one or more smart-grid servers 1010 connected to one or more wide area networks (WAN) 1020. The wireless network 1030 spans part of the distribution segment of the smart-grid. In practice, there can be more than one wireless networks in the smart-grid network. In the example presented here, there are three gateways 1040 connecting the smart-grid wireless network to the servers 1010 via the WAN 1020. In the example presented herein, there are about 27 device nodes 1050 in the wireless network 1030. In practice, there can be more or less number of devices the wireless LAN, the limit based purely on network architecture with available bandwidth, smart-grid packet traffic, and other relevant factors. Some of these device nodes can be simply packet repeaters/relays without any utility meter interfaces.

Each node sends out DISCOVERY messages to neighbor devices, and accumulates routing information from its neighbors with the received NADV messages to establish the best and optimum set of routes to send its data packets to one or more gateways. This information is transferred to the gateways. As each node establishes it has a route to the gateway via a set of neighbors or directly to the gateway, it adds to its list any device seeking a route, and informs both the seeking device and the gateway. The algorithm iterates until all redundant information is eliminated so that there are no multiple entries for the same route in the gateway and device routing table. Any device can request and obtain the latest routing table from the gateway it has access to. Each gateway maintains its own routing table corresponding to the devices seeking network egress and ingress via that gateway. The method for establishing and routinely optimizing routing information has been described earlier.

The route optimization scenario is further described as follows:

FIG. 11 lists all possible routes to the three gateways for the 27 nodes in wireless network 1030. As described earlier, the three gateways may be part of one or more overlapping wireless networks. As a result, the 27 nodes may belong to one or more wireless networks and can establish network egress/ ingress and registration with one or more gateways. In the example presented herein, there are three gateways: GW1, GW2 and GW3.

FIG. 12 shows a list of the preferred gateways among the three for the 27 nodes.

FIG. 13, FIG. 14 and FIG. 15 present examples of the routing optimization process.

FIG. 13 discusses the case of Node 1. Its preferred gateway is GW1. At initial route discovery process, Node 1 identifies two three hop routes to GW1. After listening to other neighbor nodes and analyzing the received NADV messages, Node 1 recognizes, it has three 2 hop routes available to GW1. After further optimization, Node 1 discovers a 2-hop route via Node 5 that offers best signal quality and packet delivery reliability. This information is shared with the GW1 as the most preferred route along with fall-back routing options.

Node 1 also determines it can access GW2 with a 2-hop route via Node 12, and access GW3 marginally with a three hop route via Nodes 9 and 16. This information is arrived at based on received signal quality and information received from neighbor nodes. Node 1 stores this information along with registering the information with GW2 and GW3. GW2 is the preferred fallback and GW3 may not be used unless GW1 and GW2 both become unavailable FIG. 14 presents the example of Node 11 whose preferred gateway is GW2, and the optimized route is a direct route to GW2. The preferred fallback is GW1 with a two hop route via Node 7.

FIG. 15 presents the example of Node 9 whose preferred gateway is GW3, and the optimized route is a two hop route via Node 16. The preferred fallback is GW2, with a two hop route via Node 13.

In all of the examples presented above, and in the preferred embodiment of this invention, it is the route selection algorithm in the node controller 910 of FIG. 9 at the source node that makes the final routing entry and shares the routing table information with other network nodes.

As one can see, there are a group of nodes that have a direct hop to the gateway (relay nodes and a select group of CPD nodes). These nodes become the relays for other groups of nodes which seek optimal routing to the gateway, and the gateway facilitates this routing scenario in structuring the prioritized routing table for each node and sharing it with that node. At the other end, there are a group of nodes that can only achieve multihop (2 or more hops) routing to a gateway. In these cases, reliability, prior history of a relay node, signal strength, all become part of the optimization process in selecting the preferred routing path for a node.

The routing table stored by each gateway also gives insight as to whether strategic placement of passive relays in the wireless network will help improve the routing of packets from nodes in the network, and also to balance the flow of packet traffic. Reliable packet delivery, minimal transmit power, path and link costs, error-free operation, minimal number of hops, are all part of the routing optimization.

In one exemplary embodiment the route selection algorithm can be performed as a packet is transmitted along a selected route. As described previously, a node receives updated link information from at least one other node in the wireless network. The updated link information can be retrieved by the node from packets received by the node for forwarding to another node in the wireless network. The updated link cost information can be received in response to at least one request for information of neighboring nodes. The updated link cost can specify a least possible number of hops to a destination, most robust hops to a destination, lowest traffic hops to a destination, or fastest hops to a destination.

The received link cost information can specify link cost for at least one link in the wireless utility network.

A packet received from a node in the wireless network includes a route to a destination address, the route specifying a path through one or more nodes in the wireless network. A determination is made whether there is an alternate route to the destination address. In the event an alternate route to the destination address exists, the alternate route is compared to the route included in the received packet to determine a preferred route. This comparison can involve using the received updated link information obtained by the receiving node from at least one neighboring node to determine an updated path cost of the route included in the packet, for comparison to establish the preferred route.

If the alternate route is the preferred route, the route included in the received packet is replaced with the preferred route. The received packet is then transmitted according to the route included in the packet. The selected route can be transmitted to other nodes in the wireless network.

If the preferred route is the route included in the packet prior to transmission, the preferred route can be transmitted to other nodes in the wireless network, including the updated path cost for the preferred route.

Example of Reverse Route Selection by the Gateway

FIG. 16 illustrates an example of how the gateway establishes and uses return routes for data packets received from LAN devices. The example presented here corresponds to the example wireless network described in FIG. 10, and further described in FIGS. 13, 14, and 15. They correspond to optimal routes for nodes 1, 19, and 11 to gateways GW1, GW2 and GW3. As explained earlier, the gateway controller records and maintains all optimal routes to the wireless network nodes for each corresponding gateway. In the absence of real time routing information, the gateway utilizes the routing table to extract a route for the node it is either forwarding or sending a packet. In most of the cases, a real-time packet response from a gateway to a node follows a process of simply stripping the routing address headers from the packet and reversing it for the return route from the gateway to the intended node. This is demonstrated in FIG. 16. If there is a delivery failure or if the gateway does not receive an ACK response from the device, the gateway process utilizes the routing table to identify and use alternate routing to the intended destination device.

Example of Route Selection Process Flow

FIG. 17 is an example of a simple route set up process. It uses the example of Node 1 communicating with its neighbors 2 and 21 to establish an egress route to GW2. Node 1 sends a neighbor "DISCOVERY" message 1701 to neighbor Node 2. Node 1 may also try this process with one or more other neighbors. Node 2 sends an ACK response message 1702. Node 1 now sends a "Route Info Request" message 1703. Node 2 sends "Route Info Response" message 1704 asking for Node ID etc and informing Node 1 that it has a path to GW2. Node 1 provides its ID information and request for authentication code message 1705 Node 2. Node 2 sends its link information along with authentication code to Node 1 in message 1706. Based on the information it has accumulated, Node 1 creates a preliminary source route map and packet 1707 and forwards it to Node 2. As indicated in the route map, Node 2 forwards it to Node 21 after initiating ACK to Node 1. Node 21 forwards it to the egress node GW2 per route map in the packet. It also generates an ACK to Node 2. GW2 registers Node 1, sends an optimum route map to Node 1 along with its network address and prefix (it may be in IPv4 or IPv6 format). In this return packet communication, GW2 simply reverses the routing headers and sends the packet to Node 1 via Node 21 and Node 2 in that order. The routing map to be used by Node 1 for further use in sending packets to GW2 may be the same initial route via Nodes 2 and 21, or may be different based on the updated information GW2 has in its routing table. In this example, it is assumed that the source route to be used by Node 1 is the same as before. This example demonstrates a tight knit routing methodology where devices seek optimum routes to egress points to transmit their packets.

Routing Process Control

FIG. 18 is a description of the Node Registration function 1800 in the Gateway Routing Process Control. This function mostly resides in the gateway digital controller and memory, with assistance from the LAN and WAN interface modules. The first process involves node registration. The Node Registration function 1800 involves processing of packets received from a node in the wireless network 1810, identification of the node 1820, updating Registry table 1840 if the node is sending in Registration request and is not currently registered, assigning it a network address 1853, and sending an ACK message with registration information to the output process control buffer 1860 for communicating the registration information to the source node and its neighbors. If the node is already registered, then the process moves on to the next step of processing specific requests and information by the device. The Process Control is to be accomplished within a pre-set "sequence timeout". This will trigger a "RETRY" mode.

FIG. 19 describes routing information processing function of the Gateway Process Control. This function reads received packets from each node 1910 and if the route ID in the packet header is different, then the process 1940 to update the routing table is triggered. In this process 1940, the routing tree is analyzed to identify the changes and the new routing information is entered into the routing table, and the old entry is discarded. This information is then sent to the LAN admin module for storage and further dissemination to wireless network nodes. The packet is then forwarded back to Packet Processing module 1930. If the routing info is the same, then the packet is sent directly to Packet Processing module 1930. If it is a data packet, it is then sent to GW Transmit Buffer for transmittal to the destination with appropriate address tags. If the packet is a Information Request type, the request is processed in 1960 and the device's requested information is sent to Output Process Control Buffer. At the end of each sequence of operations, the Sequence Timeout 1962 is checked and RETRY trigger is prompted.

In one preferred embodiment, spread spectrum modems are used due to their spectrum efficiency and interference tolerance. However, the invention can be practiced with other types of radios (TDMA, DSSS-CDMA, FHSS-CDMA, OFDM/OFDMA, other). Further, the invention can be practiced over wireless networks over a large frequency range (for example: 900 MHz, 1.9 GHz, and 2.4 GHz, 5.1 GHz)

Standard security solutions (for example; AES 256, SHA, RSA 2048) can be used to encapsulate the packets.

FIG. 20 describes the Device Process Control which processes incoming and outgoing packets. The outgoing packets may involve:
 initial discovery, sign-on, registration, ACK messages, predetermined status messages, last gasp messages, etc.
 responses and ACK messages sent to inquiring wireless network nodes and gateways
 routing set up and update messages
 network address update messages
 normal operational two-way message processing The modules 2071 (routing info), 2072 (meter data, device status), 2073 (routing info and network address) support the construction of outgoing data and admin packets. The device transmit/receive buffer 2010 supports the Device Digital Controller (DDC) 2020. The received packets are identified and processed in DDC's packet processing function 2030. Packets from other devices are identified and processed in "other device packet" function 2041 and the gateway packets are processed in gateway packet function 2042. Routing info and message updates from other devices are processed in function 2051, and actual data packets are processed in function 2052. Information items for storage and/or action are forwarded to Input/Output Processing module 2060. Similarly, routing updates and message responses from the gateway are processed in function 2053. Data packets are processed in function 2054. Information items for storage and/or action are forwarded to Input/Output Processing module 2060. The Input/Output processing module interfaces with the packet processing function 2030 of DDC to generate appropriate packet headers, payload information for forwarding to device transmit module.

FIG. 21 illustrates the Process Control in the Device RF Interface. The RF Interface Process Control 2112 interacts with Device Digital Controller 2111 and Device Transmit/Receive Module 2113. There are three message functions that the RF Interface Process Control 2112 performs:
 Handling of Timed Response Messages 2120. In this mode, the process handles pre-programmed transmission of status and ID messages and receiving acknowledgements from the Gateway Process Control.
 Handling of Inquiries 2130 from the utility server, gateway or other devices.
 Handling of Data Messages 2140 and sending them upstream for transmission (example: meter readings, outage condition).

In Timed Response Mode 2120, the initialization process begins at 2121. A determination is made of the timing of an event 2122. A response message is constructed and sent upstream for transmission in 2123. Receipt of ACK message from the destination source is processed in 2124. If the ACK is positive, the clock is cycled back for next event. If negative response is received, it will trigger a RETRY action 2125. If a timeout has occurred or repeated RETRY messages have failed, message authentication process 2150 is invoked. This will trigger a broadcast alert message 2160 as to the existence of this condition.

Handling of Inquiries 2130 and Data Messages 2140 follow similar step-by-step process. Once again, if repeated RETRYs fail, a broadcast alert message 2160 is triggered.

As is obvious, the gateway controller acts as an agent and a proxy for the utility server in the second network. It routes all data messages from/to the utility server to/from the devices in the wireless network. In addition, the gateway maintains network addresses, ID information, and status of all the devices in the wireless network that use it as the network egress/ingress point. The gateway controller also executes specific functions delegated to it by the utility server (for example: polling, status monitoring, network registration, routing table maintenance, DNS interface, information dissemination, network control). To perform its monitoring tasks effectively, the gateway controller performs a list of scheduled tasks on a regular basis including device ID and network address maintenance (MAC and IP addresses), route maintenance, status maintenance, polling, administrative functions, problem detection and verification, and network performance control.

The gateway controller uses timeout periods to control trigger of repeat command messages. If it receives a negative ACK message or no message at all within a certain time window, the gateway controller logs this condition (until it is changed) and sends out REPEAT or RETRY messages with specific time windows. The number of repeat attempts can be preset. If a device fails to respond to multiple repeats, the gateway may ping the neighbors of the silent node to assess whether the node has communicated with any of them. There is a process used by the gateway controller before it reaches firm conclusion that the node has totally failed, and communicates this condition to the utility server for remedial actions. Thus the gateway controller logs and stores all information pertaining to all the devices in the wireless network. The gateway controller also performs updating of the node database, software configurations/settings, security settings, etc., and regularly reports the wireless network node status to the utility server in the second network. Nodes may be deleted from the data base and new nodes and their ID and address added on a regular basis.

Emergency messages to the nodes, gateway and the utility server are handled on a priority basis and their transmission within the network preempts all routine traffic (for example; polling).

In the drawings and specifications, a typical preferred embodiment of this invention has been disclosed. The terminology and examples employed in the specifications and drawings are used purely in a descriptive sense only and should not be construed as limiting the scope of the invention that is being set forth in the following claims. It will be readily apparent to those skilled in the art that other modifications, changes, and representations can be made within the scope and spirit of the invention disclosed herein and its specifications provided in this document. The following claims shall therefore be interpreted in the broadest inclusive sense.

What is claimed is:

1. A method of routing a packet in a wireless utility network comprising:
   receiving, at a first node, updated link cost information from at least one other node in the wireless utility network;
   prioritizing, at the first node, routing table entries of alternate primary routes and secondary routes based on the updated link cost information;
   receiving, at the first node, a packet from a second node in the wireless utility network, the packet including a route to a destination address, wherein the route specifies a path through one or more other nodes in the wireless utility network;
   determining, at the first node, whether there is an alternate primary route to the destination address of the received packet;
   in the event of the determination of at least one alternate primary route to the destination address, comparing the alternate primary route to the route included in the received packet at the first node, to determine a preferred route;
   in the event the preferred route is the alternate primary route, replacing the route included in the received packet with the preferred route; and
   transmitting the packet from the first node according to the preferred route,
   wherein the determination of the preferred route includes the received updated link cost information obtained by the first node from at least one neighboring node,
   wherein the obtained information is used to determine an updated path cost of the route included in the received packet for comparison to determine the preferred route, and
   wherein each secondary route is a fallback route upon failure of the route included in the received packet.

2. The method of claim 1, wherein the received updated link cost information used to update path cost specifies one of: least possible number of hops, most robust hops, lowest traffic hops, or fastest hops.

3. The method of claim 2, wherein the received updated link cost information specifies link cost for at least one link in the wireless utility network.

4. The method of claim 2, wherein the route included in the received packet was determined by a gateway associated with the wireless utility network.

5. The method of claim 2, wherein path cost is based upon a combination of at least one of: least possible number of hops, most robust hops, lowest traffic hops, or fastest hops, links with low link costs.

6. The method of claim 2, wherein the received updated link cost information is retrieved from packets received by the first node for forwarding to another node in the wireless utility network.

7. The method of claim 2, wherein the received updated link cost information is received in response to at least one request for information of neighboring utility nodes.

8. The method of claim 2, further comprising:
   transmitting the preferred route to at least one other node in the wireless utility network.

9. The method of claim 8 wherein, in the event the preferred route is the route included in the received packet prior to transmission, the step of transmitting the preferred route to at least one other node in the wireless utility network includes transmitting the updated path cost for the preferred route.

10. The method of claim 1, wherein the first node is a utility node in the wireless utility network.

11. A wireless utility network, comprising:
    a plurality of utility nodes; and
    at least one gateway to the wireless utility network arranged to communicate with at least one of the utility nodes in the wireless utility network, the at least one gateway connecting the wireless utility network to at least one other network;
    wherein a packet transmitted from a first utility node in the wireless utility network to a second utility node in the wireless utility network is received at the second utility node according to a route included in the transmitted packet,
    wherein the route included in the packet received at the second utility node is updated with link cost information at the second node, to determine an updated path cost of the included route, and compared to alternate primary routes in a routing table of alternate primary routes and secondary routes to select a preferred route based upon path cost, and
    wherein the route included in the packet received at the second utility node is replaced with the selected preferred route at the second node, and the received packet is transmitted from the second node to another node in the utility network according to the selected preferred route, and
    wherein the secondary routes are fallback routes upon failure of the route included in the received packet.

12. The wireless utility network of claim 11, wherein the link cost information used to update path cost specifies one of: least possible number of hops, most robust hops, lowest traffic hops, or fastest hops.

13. The wireless utility network of claim 11, wherein the link cost information is retrieved from packets received by the second utility node for forwarding to another node in the wireless utility network.

14. The wireless utility network of claim 11, wherein the link cost information is received in response to at least one request for information of neighboring utility nodes.

15. The wireless utility network of claim 11, further comprising:
transmitting the selected route to at least one other node in the wireless utility network.

16. The wireless utility network of claim 15 wherein, in the event the selected route is the route included in the packet received at the second utility node prior to transmission, the step of transmitting the selected route to at least one other node in the wireless utility network includes transmitting the updated path cost for the selected route.

17. A wireless network, comprising
at least one server including a server controller and a radio, wherein the server controller controls the receipt and transmission of packets via the server radio, and wherein the server controller may select a route to nodes in the wireless network;
a plurality of nodes in the wireless network each including a node controller and a node radio, wherein the node controller controls the receipt and transmission of packets via the node radio, and wherein the node controller may select a route to the at least one server;
wherein a packet transmitted from one utility node in the wireless utility network to the server in the wireless utility network is transmitted according to a route included in the transmitted packet,
wherein the route included in a transmitted packet is updated, in at least one node along the route that receives the transmitted packet, with link cost information to determine an updated path cost of the included route and compared to alternate primary routes in a routing table of alternate primary routes and secondary routes to select a preferred route based upon path cost, and
wherein the selected preferred route is included in the packet which is transmitted from the at least one node to another node in the utility network according to the selected preferred route, and
wherein the secondary routes are fallback routes upon failure of the route included in the transmitted packet.

18. The wireless network of claim 17, wherein inclusion of the selected route includes replacing the route included in the packet by the at least one node.

19. The wireless network of claim 17, wherein the link cost information used to update path cost specifies one of: least possible number of hops, most robust hops, lowest traffic hops, or fastest hops.

20. The wireless network of claim 17, wherein path cost is based upon a combination of at least one of: least possible number of hops, most robust hops, lowest traffic hops, or fastest hops.

21. The wireless network of claim 17, wherein the link cost information is retrieved from packets received by the at least one node for forwarding to another node in the wireless utility network.

22. The wireless network of claim 17, wherein the link cost information is received in response to at least one request for information of neighboring utility nodes.

23. The wireless network of claim 17, wherein the selected preferred route is transmitted to at least one other node in the wireless utility network.

24. The wireless network of claim 23 wherein, in the event the selected preferred route is the route included in the packet prior to receipt by the at least one node, the step of transmitting the selected route to at least one other node in the wireless utility network includes transmitting the updated path cost for the selected route.

25. The wireless network of claim 24, wherein the server receiving a packet from a node examines the packet to retrieve updated path cost information, and wherein the updated path cost information is used by the server controller in route selection.

26. The wireless network of claim 25, wherein the server calculates the path cost of a route based on at least one of: least possible number of hops, most robust hops, lowest traffic hops, or fastest hops.

* * * * *